US007733545B2

United States Patent
Sakakibara et al.

(10) Patent No.: US 7,733,545 B2
(45) Date of Patent: Jun. 8, 2010

(54) IMAGE PROCESSING METHOD, PROGRAM, IMAGE PROCESSING APPARATUS, AND IMAGE FORMING SYSTEM

(75) Inventors: Shigetaka Sakakibara, Kanagawa (JP); Masakazu Yoshida, Kanagawa (JP); Masanori Hirano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 885 days.

(21) Appl. No.: 11/513,917

(22) Filed: Aug. 30, 2006

(65) Prior Publication Data

US 2007/0046707 A1 Mar. 1, 2007

(30) Foreign Application Priority Data

Sep. 1, 2005 (JP) .............................. 2005-253279

(51) Int. Cl.
*G03F 3/08* (2006.01)
*G09G 5/02* (2006.01)
*G06K 9/62* (2006.01)

(52) U.S. Cl. ...................... 358/518; 345/591; 345/604; 382/167

(58) Field of Classification Search .................. 347/14, 347/54, 15, 16; 358/1.9, 527, 520; 382/167, 382/201
See application file for complete search history.

(56) References Cited

U.S. PATENT DOCUMENTS

| 5,606,432 | A | * | 2/1997 | Ohtsuka et al. ............. 358/527 |
| 5,666,437 | A | * | 9/1997 | Vondran, Jr. ................ 382/167 |
| 5,801,722 | A | * | 9/1998 | Ueda et al. .................... 347/16 |
| 5,973,801 | A | * | 10/1999 | Bresler ........................ 358/520 |
| 6,035,065 | A | * | 3/2000 | Kobayashi et al. .......... 382/201 |
| 6,435,640 | B1 | * | 8/2002 | Yamaguchi ................... 347/15 |
| 6,796,629 | B2 | * | 9/2004 | Komatsu et al. .............. 347/15 |
| 2005/0231558 | A1 | * | 10/2005 | Chwalek et al. .............. 347/54 |

FOREIGN PATENT DOCUMENTS

| JP | 2000-190572 | 7/2000 |
| JP | 2001-16434 | 1/2001 |
| JP | 2004-266860 | 9/2004 |
| JP | 2005-1275 | 1/2005 |

* cited by examiner

*Primary Examiner*—Twyler L Haskins
*Assistant Examiner*—David L Suazo
(74) *Attorney, Agent, or Firm*—Cooper & Dunham LLP

(57) ABSTRACT

A disclosed image processing method is for generating and processing image data to be sent to an image forming apparatus including a recording head for ejecting droplets of a recording liquid, the image forming apparatus forming an image on paper based on input data. The image processing method includes: color space conversion processing upon converting input data to color space values for the image forming apparatus in accordance with a specified density or color space conversion processing upon converting input data to color space values for the image forming apparatus in accordance with characteristics regarding permeability of the paper to a coloring agent.

16 Claims, 18 Drawing Sheets

FIG.14

| INPUT VALUES | | | OUTPUT VALUES | | | |
|---|---|---|---|---|---|---|
| R | G | B | K | C | M | Y |
| 0 | 0 | 0 | 255 | 255 | 255 | 255 |
| 1 | 0 | 0 | 254 | 254 | 254 | 255 |
| ⋮ | ⋮ | ⋮ | ⋮ | ⋮ | ⋮ | ⋮ |
| 255 | 255 | 254 | 1 | 0 | 0 | 1 |
| 255 | 255 | 255 | 0 | 0 | 0 | 0 |

CMM FOR
HIGH DENSITY

CMM FOR
STANDARD DENSITY

CMM FOR
LOW DENSITY

IMAGE PROCESSING METHOD, PROGRAM, IMAGE PROCESSING APPARATUS, AND IMAGE FORMING SYSTEM

BACKGROUND OF THE INVENTION

1. Technical Field

This disclosure relates to an image processing method, a program, an image forming apparatus, an image processing apparatus, and an image forming system.

2. Description of the Related Art

Ink-jet recording apparatuses are widely known as image forming apparatuses such as printers, facsimiles, copying machines, complex machines thereof, and the like, in which a droplet ejecting head is employed as a recording head. Such ink-jet recording apparatuses perform image forming (recording, character printing, image printing, and printing are used as having the same definition) by ejecting ink as recording liquids on paper from an ink recording head (paper is not limited a specific form but includes OHP, for example, where ink liquids, other liquids, and the like are capable of adhering thereto, and paper is also referred to as record media, recording media, recording paper, recording sheet, and the like).

In order to spread ink-jet recording apparatuses from a personal environment to an office environment, the following two problems must be overcome. A first one is recording speed. Except for specific-type ink-jet recording apparatuses for industrial use, general-use ink-jet recording apparatuses perform recording by repeatedly scanning paper using a recording head much smaller than the recording paper and spraying ink liquids thereon. This method can be referred to as a recording method based on "lines" and such a method is very disadvantageous in terms of recording speed in comparison with electrophotographic image forming apparatuses performing recording based on a paper (page) unit, namely, "area".

So as to solve this disadvantage in terms of printing speed, some apparatuses improve the scanning speed by prolonging the cycle of injecting ink liquids, decrease the number of scanning by using a large size recording head or two-way recording, employs efficient scanning sequences in which scanning is controlled in the minimum length thereof by scanning only those portions for recording image data, or the like. In accordance with this, ink-jet recording apparatuses performing a small to normal amount of printing are even capable of achieving a recording speed exceeding that of electrophotographic image forming apparatuses.

A second problem is plain paper support. When dedicated paper is used, images recorded through ink-jet printing are capable of reproducing extremely high-quality images. Ink-jet recording apparatuses for personal use today are capable of obtaining such an image quality as if photographs were taken.

However, this dedicated paper is normally expensive, so that it is difficult to use such paper in companies, for example, where a strict cost management is required. Further, images output for use in the offices are not required to have such a quality. Thus, it is disadvantageous to be only capable of forming high-quality images when dedicated paper is used.

In view of this, composition of ink has been improved so as to support plain paper. For example, development of low permeation dye ink and pigment ink has been conducted and fixation adjuvant has been used, for example. Latest ink-jet recording apparatuses are capable of forming images having the same quality as that of electrophotographic image forming apparatuses even with plain paper generally used in the offices or paper generally used as copying paper.

In this manner, ink-jet recording apparatuses have become vary attractive products also for use in the offices due to improved printing speed and image quality thereof. In particular, ink-jet recording apparatuses are highly advantageous in terms of cost in comparison with laser printers and have been used as desktop printers because such ink-jet recording apparatuses have been readily downsized.

However, different from image forming apparatuses such as laser printers, offset printers, and the like in which a coloring agent is fixed on a surface of paper, ink-jet recording performing fixation using the permeation of coloring agent into paper always has problems and limitation relating to the permeation process thereof.

In other words, when plain paper support is considered, there are various types of so called "plain paper" practically available on the market, so that plain paper includes thick and thin paper, coarse and dense paper with fibers and additives, paper with additives for improving brightness, and paper classified into light coated paper in which thin coating is applied to a surface thereof, and the like. These types of "plain paper" have different permeation for a coloring agent applied to the surface thereof in each paper and thus pose a problem in that a density of recorded images may be different as a result.

In view of this, Patent Document 1 discloses a printing system for printing color images. In order to obtain desirable tone of color or gradation characteristics, the disclosed printing system outputs plural sample hues for each of basic colors, namely, R, G, B, from the printer based-on data not subjected to a color balance modification from processing of basic color setting of a printer driver. A color balance table correction process adjusts modification parameters of a color balance modification table used in a color modification process. In accordance with this, in a printing process performed after the color adjusting process, a color balance modification is performed based on tone of color determined by user preference (selection).

Patent Document 1: Japanese Laid-Open Patent Application No. 2000-190572

In addition, regarding the difference of density of recorded images, Patent Document 2 discloses a printing method. The disclosed printing method flexibly sets the amount of a printing agent used upon printing in each printing condition so as to maintain reproducibility of color of a printing result. An application outputs a printing direction of printing data. A printing information obtaining unit in a printer driver or a printer obtains various types of limitation such as types of image, printing methods, and the like, namely, colors of toner used upon printing, an intensive number, simplex/duplex printing, the number of scanning for character printing, and the like. The printing information obtaining unit transmits the obtained limitation to a data calculating unit in a usage limiting unit. In accordance with this, limitation values of usage of the printing agent in each of obtained limitation are switched.

Patent Document 2: Japanese Laid-Open Patent Application No. 2005-001275

Further, Patent Document 3 discloses another printing method. The disclosed printing method is capable of readily adjusting arrangement positions of attachment information, density of printing, and sizes, and of printing desired attachment information along with images without losing impression of printed images. The attachment information printed along with image information is selected on an image selecting screen displayed on a display unit, the image information being read by an image scanner unit. A printing position of the selected attachment information, density of printing, a printing size are selected and specified on a position selecting screen, a density specifying screen, and a size specifying screen. An attachment information processing unit attaches image information to be read in accordance with the specified printing position, density, and size. A printer unit prints the image information on a recording medium, the information being provided with the attachment information.

Patent Document 3: Japanese Laid-Open Patent Application No. 2001-016434

Further, Patent Document 4 discloses another printing method. The disclosed printing method is capable of automatically performing a color matching process in accordance with types of objects on a printer drive side. A type determining unit determines types of objects to be drawn based on an input drawing order. An attribute information replacing unit holds plural sets of attribute information of a color matching method prepares in each type of objects, selects corresponding attribute information from the plural sets of attribute information based on the determination result of the type determining unit, replaces attribute information attached to the drawing order with the selected attribute information, and outputs the drawing order and drawing color information to a color changing unit. The color changing unit performs a color matching process on the drawing color information based on the attribute information replaced by the attribute information replacing unit.

Patent Document 4: Japanese Laid-Open Patent Application No. 2004-266860

In the above-mentioned methods of adjusting the density of recorded images, γ correction or adjustment of a halftone process value is performed. However, when density is adjusted based on such γ correction or adjustment of a halftone process is performed, gradation characteristics are inverted, so that density is adjusted without maintaining gradation.

SUMMARY

In an aspect of this disclosure, there is provided an image processing method, program for causing a computer to perform the image processing method, image processing apparatus provided with the program, and an image forming system provided with the image processing apparatus that can adjust density while maintaining gradation as much as possible.

According to another aspect, there is provided an image processing method fix generating and processing image data to be sent to an image forming apparatus including a recording head for ejecting droplets of a recording liquid, the image forming apparatus forming an image on paper based on input data, the image processing method comprising: color space conversion processing upon converting input data to color space values for the image forming apparatus in accordance with a specified density.

According to another aspect, there is provided an image processing method for generating and processing image data to be sent to an image forming apparatus including a recording head for ejecting droplets of a recording liquid, the image forming apparatus forming an image on paper based on input data, the image processing method comprising: color space conversion processing upon converting input data to color space values for the image forming apparatus in accordance with characteristics regarding permeability of the paper to a coloring agent.

In the above-mentioned image processing method, information on the characteristics regarding the permeability of the paper to a coloring agent may be provided from a user, provided based on a detection result of brightness or density of the paper, provided based on a detection result of a paper feed unit feeding the paper, or provided based on a detection result of a density of an image formed on the paper.

In the above-mentioned image processing method, a plurality of tables of color space conversion processing used upon converting input data to color space values may be included. In this case, the tables of color space conversion processing preferably have different gradation characteristics in each of objects constituting image data to be output and table values so as not to cause reverse gradations.

Further, the above-mentioned image processing method may include a table of color space conversion processing used as a standard, wherein values from the table of color space conversion processing are multiplied by a quadratic coefficient so as to perform color space conversion processing. In this case, preferably, the quadratic coefficient to be multiplied has different values in each hue and a maximum value of each hue after the color space conversion processing is a coefficient value for "a maximum amount of a primary color in a color space after conversion≦a value after conversion≦a maximum amount of attachment of a recording liquid defined under printing conditions".

Further, preferably, the quadratic coefficient to be multiplied is configured to have different coefficient values in a gradation direction in each object constituting image data to be output and to cause no reverse gradation characteristics before and after the multiplication. Further, it is preferable to perform, based on a result of selection, either color space conversion processing where the coefficient multiplication processing is performed or color space conversion processing where the coefficient multiplication processing is not performed.

According to another aspect, there is provided a computer-readable program which, when executed by a computer, causes the computer to perform a process for generating image data to be sent to an image forming apparatus including a recording head for ejecting droplets of a recording liquid, the image forming apparatus forming an image based on input data, the process comprising the above-mentioned image processing method.

According to another aspects, there is provided an image processing apparatus for generating image data to be sent to an image forming apparatus including a recording head for ejecting droplets of a recording liquid, the image forming apparatus forming an image based on input data, the image processing apparatus including the above-mentioned program.

According to another aspect, there is provided an image forming system including the above-mentioned image processing apparatus, the image forming apparatus having a recording head for ejecting droplets of a recording liquid and forming an image.

According to the above-mentioned image processing method, computer-readable program, image processing apparatus, and image forming system, upon converting input data to color space values for the image forming apparatus color space conversion processing is performed in accordance with a specified density or characteristics regarding permeability of paper to a coloring agent. Thus, it is readily possible co prevent reverse gradations and to adjust density while maintaining gradations, thereby improving image quality. Further, by performing color space conversion processing in accordance with the characteristics regarding permeability of paper to a coloring agent, it is possible to control the reduction of density resulting from the characteristics regarding permeability of paper to a coloring agent.

Other aspects, features and advantage will become more apparent from the following detailed description when read in conjunction with the accompanying drawings. dr

BRIEF DESCRIPTION OF THE DRAWINGS

FIG. 14 is a diagram showing an example of a table of color space conversion processing;

DETAILED DESCRIPTION OF THE PREFERRED EMBODIMENTS

Figure 1:
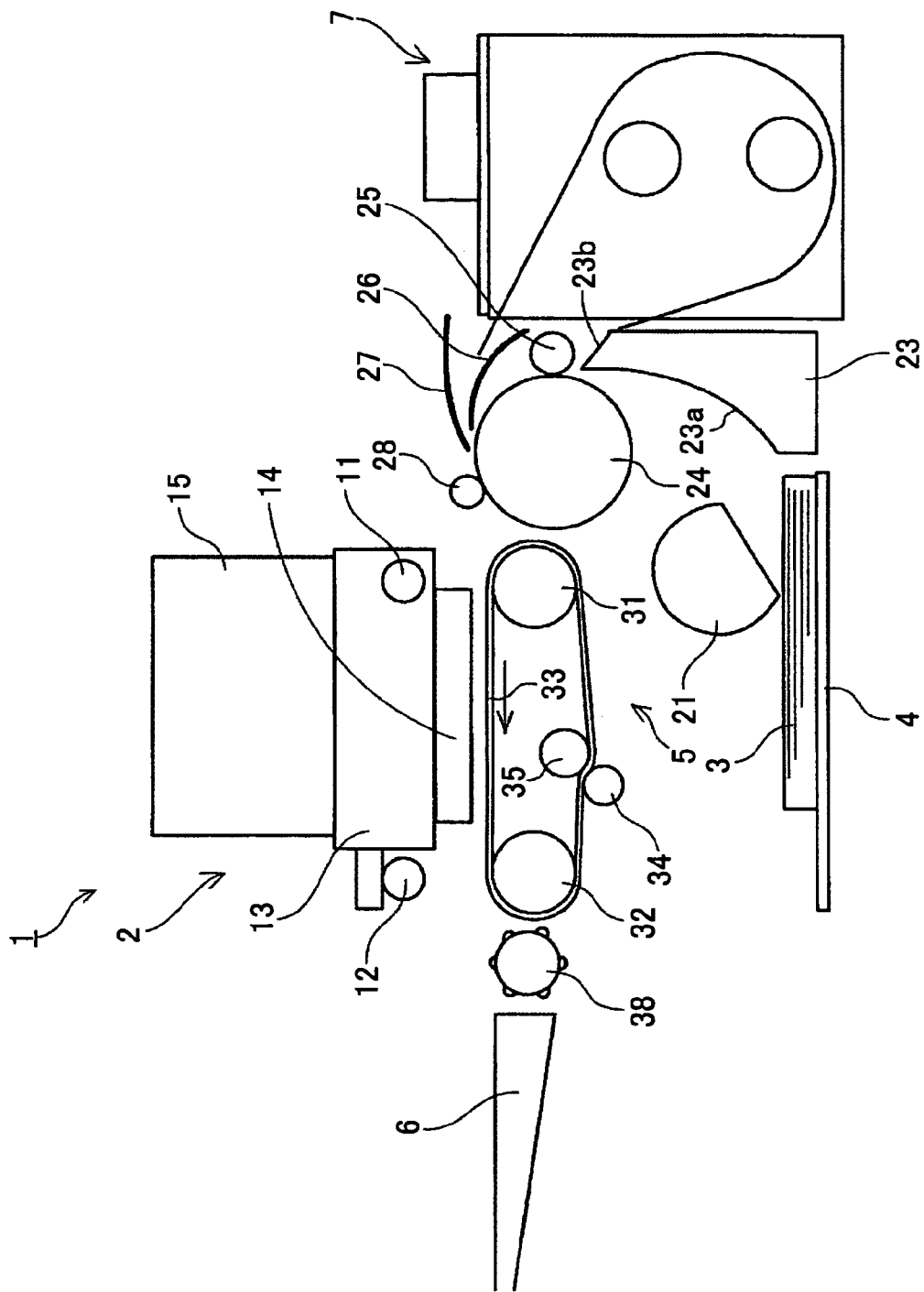
FIG. 1 is a schematic diagram of mechanical elements of an ink-jet recording apparatus showing an example of an image forming apparatus.
Figure 2:
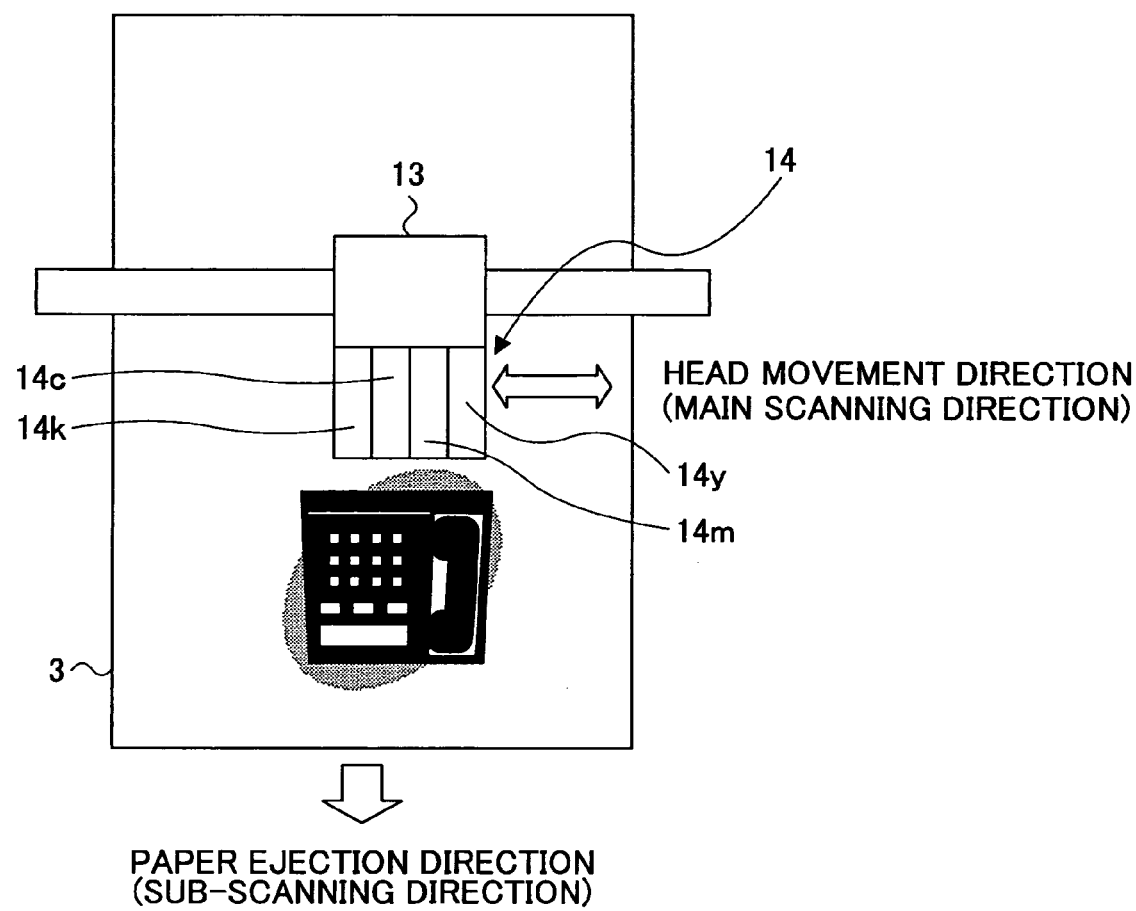
FIG. 2 is a plan view showing main elements of the mechanical elements.
Figure 3:
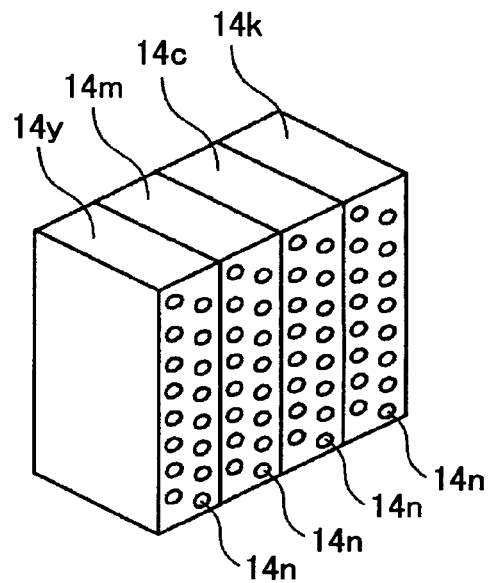
FIG. 3 is a perspective view describing a structure of a head unit of the apparatus.
Figure 4:
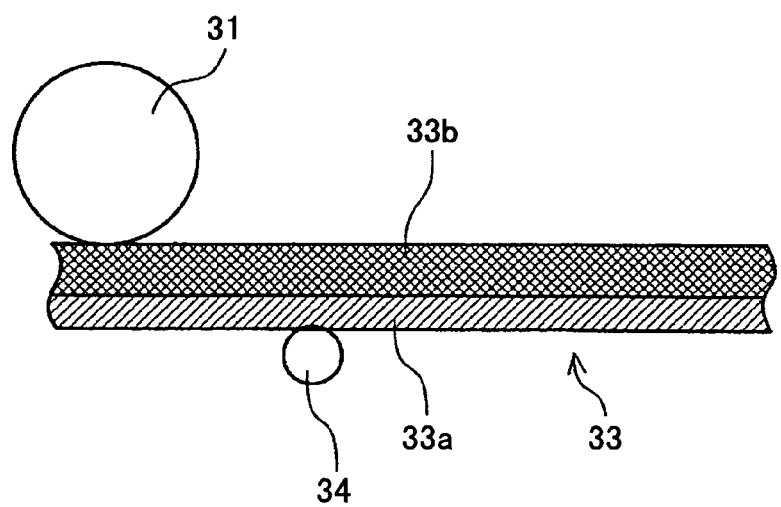
FIG. 4 is an illustration describing an example of a conveying belt of the apparatus.

In the following, embodiments of the present invention will be described with reference to the accompanying drawings. First, an example of an ink-jet recording apparatus as an image forming apparatus is described with reference to FIGS. 1 to 4. FIG. 1 is a schematic diagram of entire mechanical elements of the ink-jet recording apparatus. FIG. 2 is a plan view showing main elements of the recording apparatus. FIG. 3 is a perspective view describing a structure of a head unit of the recording apparatus. And, FIG. 4 is a schematic cross-sectional view showing a conveying belt of the recording apparatus.

The ink-jet recording apparatus includes an image forming unit 2 and the like in the inside of an apparatus body 1 and a paper feed tray 4 capable of carrying multiple sheets of recording media (hereafter referred to as "paper") in a lower side of the apparatus body 1. The ink-jet recording apparatus takes in paper 3 fed from the paper feed tray 4, records a predetermined image using the image forming unit 2 while conveying the paper 3 using a conveying mechanism 5. Thereafter, the ink-jet recording apparatus ejects the paper 3 on a paper ejection tray 6 installed on a side of the apparatus body 1.

The ink-jet recording apparatus also includes a duplex unit 7, which is detachable from the apparatus body 1. Upon performing duplex printing, after a one side (surface) printing is ended, the ink-jet recording apparatus takes in the paper 3 in the duplex unit 7 while conveying the paper 3 in the reverse direction using the conveying mechanism 5 and turns over the paper 3 to feed the other side (reverse) as a printable surface to the conveying mechanism 5 again. When printing of the other side (reverse) is ended, the ink-jet recording apparatus ejects the paper 3 on the paper ejection tray 6.

In this case, the image forming unit 2 slidably holds a carriage 13 on guide shafts 11 and 12 and moves (main scanning) the carriage 13 in a direction orthogonal relative to a conveying direction of the paper 3 using a main scanning motor not shown in the drawings. On the carriage 13, a recording head 14 made of a droplet ejecting head including nozzle perforations 14n (refer to FIG. 3) is installed, the nozzle perforations 14n being arranged as plural ejection ports for ejecting droplets. Further, the carriage 13 includes an ink cartridge 15 detachably installed thereon, the ink cartridge 15 supplying liquid to the recording head 14. In addition, a sub-tank may be configured to be installed instead of the ink cartridge 15 and ink may be supplied to the sub-tank from a main tank.

In this case, as shown in FIGS. 2 and 3, for example, the recording head 14 includes four independent ink-jet heads 14y, 14m, 14c, and 14k as a droplet ejecting head for ejecting each of yellow (Y), magenta (M), cyan (C), and black (B) ink liquids. However, the recording head 14 may use a single or plural heads having plural nozzle columns for ejecting ink liquids of each color. In addition, the number of colors and order of arrangement are not limited to this example.

Examples of ink-jet heads constituting the recording head 14 include a piezoelectric actuator such as a piezoelectric element, a thermal actuator performing based on phase change resulting from film boiling of liquid using an electro-thermal conversion element such as a heat element, a shape memory alloy actuator performing based on metallic phase change from thermal change, an electrostatic actuator performing based on electrostatic force, and the like as an energy generating unit ejecting ink.

Each sheet of the paper 3 in the paper feed tray 4 is separated by a paper feed runner (semicircular runner) 21 and a separation pad (not shown in the drawings), fed to the inside of the apparatus body 1, and then sent to the conveying mechanism 5.

The conveying mechanism 5 includes a conveying guide unit 23 guiding the fed paper 3 upward along a guide surface 23a and guiding the paper 3 sent from the duplex unit 7 along a guiding surface 23b, a conveying roller 24 for conveying the paper 3, a pressure runner 25 for pressing the paper 3 against the conveying roller 24, a guide member 26 for guiding the paper 3 to the conveying roller 24, a guide member 27 for guiding the paper 3 to the duplex unit 7, the paper 3 being returned upon duplex printing, and a pressing runner 28 for pressing the paper 3 sent from the conveying roller 24.

The conveying mechanism 5 further includes a conveying belt 33 placed between a driving roller 31 and a driven roller 32 so as to convey the paper 3 for the recording head 14 while maintaining flatness of the paper 3, an electrification roller 34 for electrifying the conveying belt 33, and a guide roller 35 facing the electrification roller 34. In addition, the conveying mechanism 5 includes a guide member (platen plate) for guiding the conveying belt 33 using a portion facing the image forming unit 2, a cleaning roller made of a porous body and the like, the cleaning roller removing recording liquids (ink) adhered to the conveying belt 33 as a cleaning unit, and the like (not shown in the drawings).

In this case, the conveying belt 33 is an endless belt placed between the driving roller 31 and the driven roller 32 (tension roller) and configured to rotate in a direction (paper conveying direction) indicated by an arrow of FIG. 1.

The conveying belt 33 may be configured to have a single layer structure, a double layer structure with a first layer (foremost surface layer) 33a and a second layer (reverse layer) 33b, or a triple layer structure or more. For example, the conveying belt 33 includes a surface layer as a paper attracting surface made of a resin material with a pure thickness of about 40 μm to which no resistance control is applied, such as an ETFE pure material, and a reverse layer (middle-resistivity layer, earth layer) made of the same material as the surface layer to which resistance control is applied using carbon.

The electrification roller 34 is positioned to be brought into contact with the surface of the conveying belt 33 and rotated in accordance with a rotation of the conveying belt 33. A high voltage from a high-tension circuit (high-voltage power supply) is applied to the electrification roller 34 in a predetermined pattern.

Further, the conveying mechanism 5 includes a paper ejection roller 38 on a downstream side thereof, the paper ejection roller 38 sending the paper 3 in which an image is recorded to the paper ejection tray 6.

In an image forming apparatus constructed in this manner, the conveying belt 33 is rotated in the direction indicated by the arrow and is positively electrified when it is brought into contact with the electrification roller 34 to which an application voltage having high potential is applied. In this case, the conveying belt 33 is electrified from the electrification roller 34 to have a predetermined charge length by switching polarity at predetermined intervals.

In this case, when the paper 3 is fed on the conveying belt 33 electrified to have a high potential, the paper 3 is polarized in an inside thereof, so that an electric charge of the paper 3 having a polarity opposite to that of an electric charge on the conveying belt 33 is induced on a surface of the paper 3 in contact with the conveying belt 33. The electric charge on the conveying belt 33 and the electric charge induced on the paper 3 to be conveyed are electrostatically drawing each other, so that the paper 3 is electrostatically attracted to the conveying belt 33. In this manner, warping and unevenness of the paper 3 firmly attracted to the conveying belt 33 are corrected, so that highly level surface is formed.

Figure 5A:
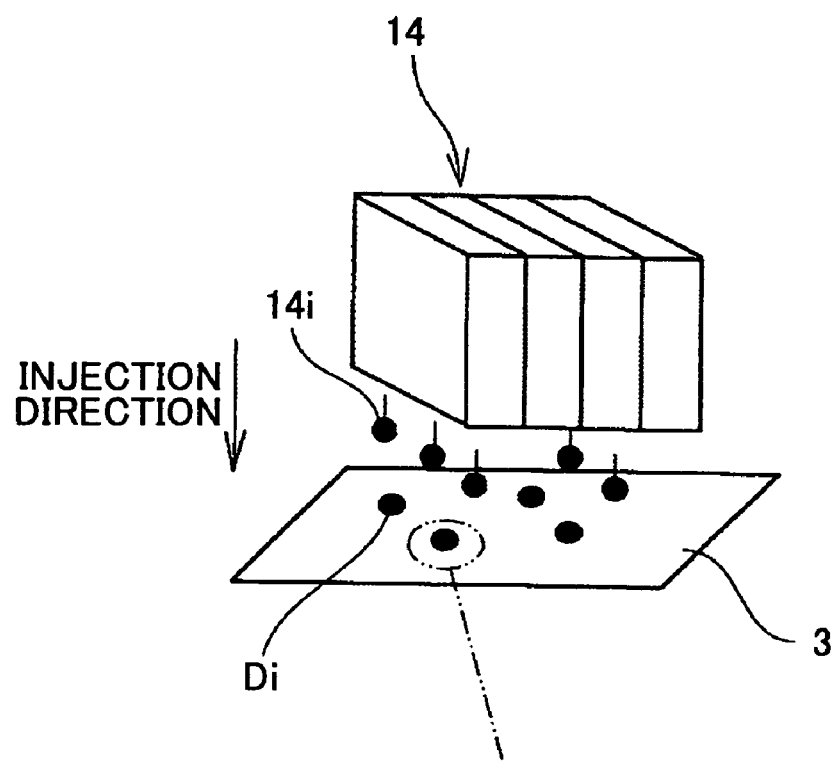
FIG. 5A is an illustration describing an image forming operation of the apparatus.
Figure 5B:
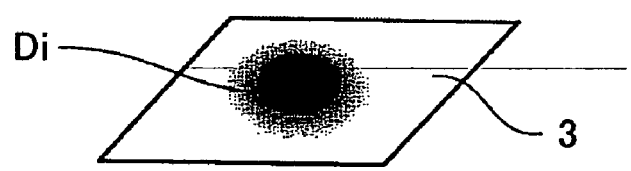
FIG. 5B is an illustration describing an enlarged dot.

The paper 3 is moved by rotating the conveying belt 33 and the recording head 14 is driven depending on an image signal while the carriage 13 is moved to scan in a one-way direction or two-way directions. As shown in FIGS. 5A and 5B, droplets 14i are ejected (injected) from the recording head 14 and the droplets as an ink liquid are impacted on the stationary paper 3 to form dots Di. In accordance with this, a single row is recorded and recording of the next row is performed after the paper 3 is conveyed by a predetermined length. The recording operation is ended when a recording end signal or a signal indicting that a rear end of the paper 3 has reached a recording area. In addition, FIG. 5B is an enlarged dot Di 5A shown in FIG. 5A.

In this manner, the image-recorded paper 3 is ejected on the paper ejection tray 6 by the paper ejection roller 38.

Next, ink used in the ink-jet recording apparatus as a recording liquid is described.

In the present invention, although pigment as a coloring agent for ink used in the image forming apparatus is not especially limited, the following pigments are preferably used, for example. Moreover, these pigments may be mixed and used with plural types thereof.

Examples of organic pigments include azo pigments, phthalocyanine pigments, anthraquinone pigments, quinacridone pigments, dioxazine pigments, indigo pigments, thioindigo pigments, perylene pigments, isoindolinone pigments, aniline black pigments, azomethine pigments, rhodamine B lake pigments, carbon black pigments, and the like.

Examples of inorganic pigments include iron oxide, titanium oxide, calcium carbonate, barium sulfate, aluminum hydroxide, barium yellow, iron blue, cadmium red, chrome yellow, metallic powder, and the like.

A particle size of these pigments preferably ranges from 0.01 to 0.30 μm. If the particle size is not more than 0.01 μm, the particle size is close to that of a dye, so that light resistance and feathering are deteriorated. Also, if the particle size is not less than 0.30 μm, clogging in ejection ports and in a filter of the printer is generated, so that ejection stability is not obtained.

Examples of carbon black used for black pigment ink include carbon black manufactured by a furnace method or a channel method, in which a size of primary particles preferably ranges from 15 to 40 millimicrons, a specific surface by a BET method ranges from 50 to 300 square meter/g, DBP oil absorption ranges from 40 to 150 ml/100 g, volatile portions range from 0.5 to 10%, and ph value ranges from 2 to 9. Examples of such carbon black include: No. 2300, No. 900, MCF-88, No. 33, No. 40, No. 45, No. 52, MA7, MA8, MA100, No. 2200B (manufactured by Mitsubishi Chemical Corp.); Raven 700, Raven 5750, Raven 5250, Raven 5000, Raven 3500, and Raven 1255 (manufactured by Columbian Carbon Co.); Regal 400R, Regal 330R, Regal 660R, Mogul L, Monarch 700, Monarch 800, Monarch 880, Monarch 900, Monarch 1000, Monarch 1100, Monarch 1300, Monarch 1400 (manufactured by Cabot Corp.); and Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4, (manufactured by Degussa AG.), and the like. However, black carbon is not limited to these specifically disclosed materials.

Specific examples of color pigment are described in the following.

Examples of organic pigments include azo pigments, phthalocyanine pigments, anthraquinone pigments, quinacridone pigments, dioxazine pigments, indigo pigments, thioindigo pigments, perylene pigments, isoindolinone pigments, aniline black pigments, azomethine pigments, rhodamine B lake pigments, carbon black pigments, and the like. Examples of inorganic pigments include iron oxide, titanium oxide, calcium carbonate, barium sulfate, aluminum hydroxide, barium yellow, iron blue, cadmium red, chrome yellow, metallic powder, and the like.

Specific examples in each color are described in the following.

Examples of pigment used for yellow ink include CI Pigment Yellow 1, CI Pigment Yellow 2, CI Pigment Yellow 3, CI Pigment Yellow 12, CI Pigment Yellow 13, CI Pigment Yellow 14, CI Pigment Yellow 16, CI Pigment Yellow 17, CI Pigment Yellow 73, CI Pigment Yellow 74, CI Pigment Yellow 75, CI Pigment Yellow 83, CI Pigment Yellow 95, CI Pigment Yellow 97, CI Pigment Yellow 98, CI Pigment Yellow 114, CI Pigment Yellow 128, CI Pigment Yellow 129, CI Pigment Yellow 151, CI Pigment Yellow 154, and the like. However, pigment used for yellow ink is not limited to these specifically disclosed materials.

Examples of pigment used for magenta ink include CI Pigment Red 5, CI Pigment Red 7, CI Pigment Red 48 (Ca), CI Pigment Red 48 (Mn), CI Pigment Red 57 (Ca), CI Pigment Red 57:1, CI Pigment Red 112, CI Pigment Red 123, CI Pigment Red 168, CI Pigment Red 184, CI Pigment Red 202, and the like. However, pigment used for magenta ink is not limited to these specifically disclosed materials.

Examples of pigment used for cyan ink include CI Pigment Blue 1, CI Pigment Blue 2, CI Pigment Blue 3, CI Pigment Blue 15:3, CI Pigment Blue 15:34, CI Pigment Blue 16, CI Pigment Blue 22, CI Pigment Blue 60, CI Vat Blue 4, CI Vat Blue 60, and the like. However, pigment used for cyan ink is not limited to these specifically disclosed materials.

Further, pigment included in each ink used in the present invention may be newly manufactured for the present invention.

The above-mentioned pigments can be used as an ink-jet recording liquid by dispersing in an aqueous medium using a polymer dispersing agent or a surface active agent. Examples of such a dispersing agent include normal water soluble resin and water-soluble surface active agent.

Specific examples of water-soluble resin include block copolymers or random copolymers made from at least two of styrene, styrene derivatives, vinylnaphthalene derivatives, aliphatic alcoholic esters of α, β-ethylene unsaturated carboxylic acids, acrylic acids, acrylic acid derivatives, maleic acids, maleic acid derivatives, itaconic acids, itaconic acid derivatives, fumaric acids, fumaric acid derivatives, and the like, and salts thereof.

These water-soluble resins are alkali-soluble resin which is soluble in a solution in which bases are dissolved. Those resins with a weight average molecular weight ranging from 3000 to 20000 are especially preferable in that the resins are capable of making a dispersion liquid have a low viscosity and easy dispersion when used for recording liquids for ink-jet printing.

It is preferable to use a polymer dispersing agent and a self-dispersing pigment at the same time, since a moderate dot size is obtained. Although a mechanism thereof is less obvious, the following reasons are considered.

By containing the polymer dispersing agent, permeation into recording paper is controlled. On the other hand, by containing the polymer dispersing agent, coagulation of the self-dispersing pigment is reduced, so that the self-dispersing pigment is capable of smoothly spreading in a lateral direction. In accordance with this, dots are spread in a wide and thin manner and ideal dots can be formed.

Specific examples of water-soluble surface active agent that can be used as a dispersing agent include the following materials. Examples of anionic surface active agent include higher fatty acid salt, alkylsulfuric acid salt, alkyl ether sulfate, alkyl ester sulfate, alkyl aryl ether sulfate, alkyl sulfonate, sulfosuccinate, alkyl aryl and alkylnaphthalene sulfonate, alkyl phosphate, polyoxyethylene alkyl ether phosphate ester, alkyl aryl ether phosphate, and the like. Examples of cationic surface active agent include salts, dialkylamine salts, tetra-alkylammonium salts, benzalkonium salts, alkylpyridinium salts, imidazolinium salts, and the like.

Examples of ampholytic surface active agent include dimethyl alkyl lauryl betaine, alkyl glycine, alkyl (diaminoethyl) glycin, imidazolinium betaine, and the like. Examples of nonionic surface active agent include polyoxyethylene alkyl ether, polyoxyethylene alkyl allyl ether, polyoxyethylene polyoxypropylene glycol, glycerin ester, sorbitan ester, sucrose ester, polyoxyethylene ether of sorbitol ester, fatty acid alkanolamide, polyoxyethylene fatty acid amide, amine oxide, polyoxyethylene alkylamine, and the like.

Pigments may be microencapsulated by coating with resin having a hydrophilic group so as to provide dispersibility.

As a method for microencapsulating water-insoluble pigment by coating with organic polymers, any known methods may be used. Examples of known methods include chemical manufacturing methods, physical manufacturing methods, mechanical manufacturing methods, and the like. Specifically, examples of such methods include interfacial polymerization methods, in-situ polymerization methods, cure coating in-liquid methods, coacervation (phase separation) methods, drying in-liquid methods, fusion dispersion cooling methods, aerial suspension coating methods, spray drying methods, acid separation methods, phase inversion emulsification methods, and the like.

The interfacial polymerization methods refer to methods of forming a wall film in which two types of monomers or two types of reactants are separately dissolved in a dispersed phase and a continuous phase and then the wall film is formed by reacting both materials at phase boundary thereof. The in-situ polymerization methods refer to methods of forming a wall film in which two types of materials, namely, a liquid or gaseous monomers and a catalyst or a reactive material are supplied from one side of nuclear particles of continuous phase so as to cause a reaction, thereby forming a wall film. The cure coating in-liquid methods refer to methods of forming a wall film in which droplets of a polymer solution containing core material particles are insolubilized in the liquid by a curing agent or the like, thereby forming a wall film.

Coacervation (phase separation) methods refer to methods of forming a wall film in which a polymer-dispersed liquid containing core material particles dispersed therein is separated into a coacervate with a high concentration of polymers (dense phase) and a sparse phase, and a wall film is formed. The drying in-liquid methods refer to methods of forming a wall film in which a liquid containing core materials in a solution of wall film materials is prepared and a dispersion liquid is supplied to the liquid where a continuous phase of the dispersion liquid is not miscible so as to have a complex emulsion, and then a wall film is formed by gradually removing medium into which the wall film materials are dissolved.

The fusion dispersion cooling methods refer to methods of forming a wall film, in which wall film materials which are fused upon heating and are solidified at normal temperature are used. The materials are heated to be a liquid and core material particles are dispersed thereinto. The core material particles are made to be fine particles and cooled, thereby forming a wall film. The aerial suspension coating methods refer to methods of forming a wall film in which core material particles in a powder form are suspended in the air using a fluidized bed and a coating liquid is sprayed and mixed with the core material particles floating in an airflow, and then a wall film is formed.

The spray drying methods refer to methods of forming a wall film in which an undiluted encapsulating solution is sprayed and brought into contact with a heated air and a wall film is formed by allowing a volatile component to be evaporated and dried. The acid separation methods refer to methods of forming a wall film. At least a portion of anionic groups of organic polymer compounds containing the anionic groups is neutralized using basic compounds. In accordance with this, solubility to water is provided and the solubility-provided anionic groups are mixed with a coloring agent in an aqueous medium. Then, the resultant substance is made neutral or acidic using acidic compounds, organic compounds are separated and bonded to the coloring agent, and then the substance is neutralized and dispersed. In the phase inversion emulsification methods, a mixture containing anionic organic polymers having a dispersion potential relative to water and a coloring agent is used as an organic solvent phase. Water is provided to the organic solvent phase or the organic solvent phase is provided to water.

Examples of organic polymers (resins) used as materials constituting wall film materials of microcapsules include polyamides, polyurethane, polyester, polyurea, epoxy resin, polycarbonate, urea resin, melamine resin, phenolic resin, polysaccharides, gelatin, gum arabic, dextran, casein, proteins, natural rubber, carboxypolymethylene, polyvinyl alcohol, polyvinyl pyrrolidone, polyvinyl acetate, polyvinyl chloride, polyvinylidene chloride, cellulose, ethyl cellulose, methyl cellulose, nitrocellulose, hydroxyethyl cellulose, cellulose acetate, polyethylene, polystyrene, (metha) acrylic acid polymers or copolymers, (metha) acrylic ester polymers or copolymers, (metha) acrylic acid-(metha) acrylic ester copolymers, styrene-(metha) acrylic copolymers, styrene-maleic acid copolymers, alginic acid soda, fatty acids, paraffin, beeswax, aqueous wax, solid beef tallow, carnauba wax, albumin, and the like.

From the above-mentioned materials, it is possible to use organic polymers having anionic groups such as carboxylic groups or sulfonic groups. Also, Examples of nonionic organic polymers include polyvinyl alcohol, polyethylene glycol monomethacrylate, polypropylene glycol monomethacrylate, methoxypolyethylene glycol monomethacrylate, or (co)polymers thereof, cationic ring-opening copolymers of 2-oxazoline, and the like. In particular, completely saponified polyvinyl alcohol is particularly preferable in that it has low water solubility and that it is soluble in hot water but less soluble in cold water.

Further, an amount of the organic polymers constituting the wall film materials of microcapsules ranges from not less than 1% by weight to not more than 20% by weight relative to a water-insoluble coloring agent such as organic pigments, carbon black, or the like. By maintaining the amount of the organic polymers within the above-mentioned range, a percentage of content of the organic polymers in the capsules is made to be relatively low, so that it is possible to control reduction of color development of pigments resulting from the fact that surfaces of pigment are covered with the organic polymers. If the amount of the organic polymers is less than 1%, the effect of encapsulation is unlikely to be obtained. By contrast, if the amount exceeds 20%, the reduction of color development of pigments becomes large. Taking into consideration other characteristics in addition to the above-mentioned fact, the amount of organic polymers preferably ranges from 5% to 10% by weight relative to a water-insoluble coloring agent.

In other words, a portion of the coloring agent is practically uncoated and exposed, so that it is possible to control the reduction of color development of pigments. Further, by contrast, since a portion of the coloring agent is practically coated and unexposed, it is also possible to have an effect such that the pigments are partially coated at the same time. Moreover, a number average molecular weight of organic polymers is preferably not less than 2000 in terms of a capsule manufacturing process and the like. In this case, the term "practically exposed" does not refer to a partial exposure from pinholes or cracking accompanied by defects, but means an intentional exposure.

Further, if an organic pigment such as a self-dispersing pigment or self-dispersing carbon black is used as a coloring agent, dispersibility of the pigment is improved even when the percentage of content of the organic polymers in the capsules is low. This is more preferable in the present invention since sufficient preservation stability for ink is obtained.

In addition, depending on methods of microencapsulation, it is preferable to select organic copolymers suitable thereto. For example, in the case of the interfacial polymerization method, examples of suitable organic polymers include polyester, polyamide, polyurethane, polyvinyl pyrrolidone, epoxy resin, and the like. In the case of the in-situ polymerization method, examples of suitable organic polymers include (metha) acrylic ester polymers or copolymers, (metha) acrylic acid-(metha) acrylic ester copolymers, styrene-(metha) acrylic copolymers, polyvinyl chloride, polyvinylidene chloride, polyamide, and the like. In the case of the cure coating in-liquid method, examples of suitable organic polymers include alginic acid soda, polyvinyl alcohol, gelatin, albumin, epoxy resin, and the like. In the case of the coacervation method, examples of suitable organic polymers include gelatin, celluloses, casein, and the like. Further, in order to obtain fine and homogeneous microencapsulated pigments, any known encapsulation methods may be used in addition to the above-mentioned methods.

If the phase inversion or acid separation method is selected as a microencapsulation method, anionic organic polymers are used as organic polymers constituting wall film materials of microcapsules. In the phase inversion method, a compound or complex of anionic organic polymers having a self-dispersion potential or solubility potential relative to water and a coloring agent such as self-dispersive organic pigment, self-dispersive carbon black, or the like is used as an organic solvent phase. Or a mixture of a coloring agent such as a self-dispersive organic pigment or self-dispersive carbon black or a curing agent and anion organic polymers is used as an organic solvent phase. By providing water to the organic solvent phase or providing the organic solvent phase to water, microencapsulation is performed during self-dispersion (phase inversion emulsification). In the above phase inversion method, vehicles for a recording liquid and additives may be mixed into the organic solvent phase during manufacturing process thereof. In particular, taking into consideration the fact that a dispersion liquid for the recording liquid is directly manufactured, it is more preferable to mix liquid media of the recording liquid.

By contrast, in the acid separation method, at least a portion or an entire portion of anionic groups of organic polymers containing the anionic groups is neutralized using basic compounds. And, the anionic groups are mixed with a coloring agent such as a self-dispersive organic pigment or self-dispersive carbon black in an aqueous medium. Then, pH of the resultant substance is made neutral or acidic using acidic compounds, organic polymers containing the anionic groups are separated and bonded to the coloring agent, thereby obtaining a hydrated cake. The cake is microencapsulated by neutralizing a portion or an entire portion of anionic groups using basic compounds. In this manner, it is possible to manufacture an aqueous dispersion liquid containing fine anionic microencapsulated pigment having much pigment.

Further, examples of solvent used upon microencapsulation as mentioned above include: alkyl alcohols such as methanol, ethanol, propanol, butanol and the like; aromatic hydrocarbons such as benzole, toluole, xylole, and the like; esters such as methyl acetate, ethyl acetate, butyl acetate, and the like; chlorinated hydrocarbons such as chloroform, ethylene dichloride, and the like; ketones such as acetone, methyl isobutyl ketone, and the like; ethers such as tetrahydrofuran, dioxane, and the like; and cellosolves such as methyl cellosolve, butyl cellosolve, and the like. The microcapsules manufactured in the above-mentioned manner are separated from the solvent using centrifugal separation, filtration, or the like, and the separated substance is agitated and dispersed again with water and a required solvent, thereby obtaining a recording liquid that can be used in the present invention. An average particle size of encapsulated pigment obtained from the aforementioned method is preferably ranges from 50 nm to 180 nm.

It is possible to improve abrasion durability of printing by firmly attaching pigment to a printing material through resin coating.

Figure 6:
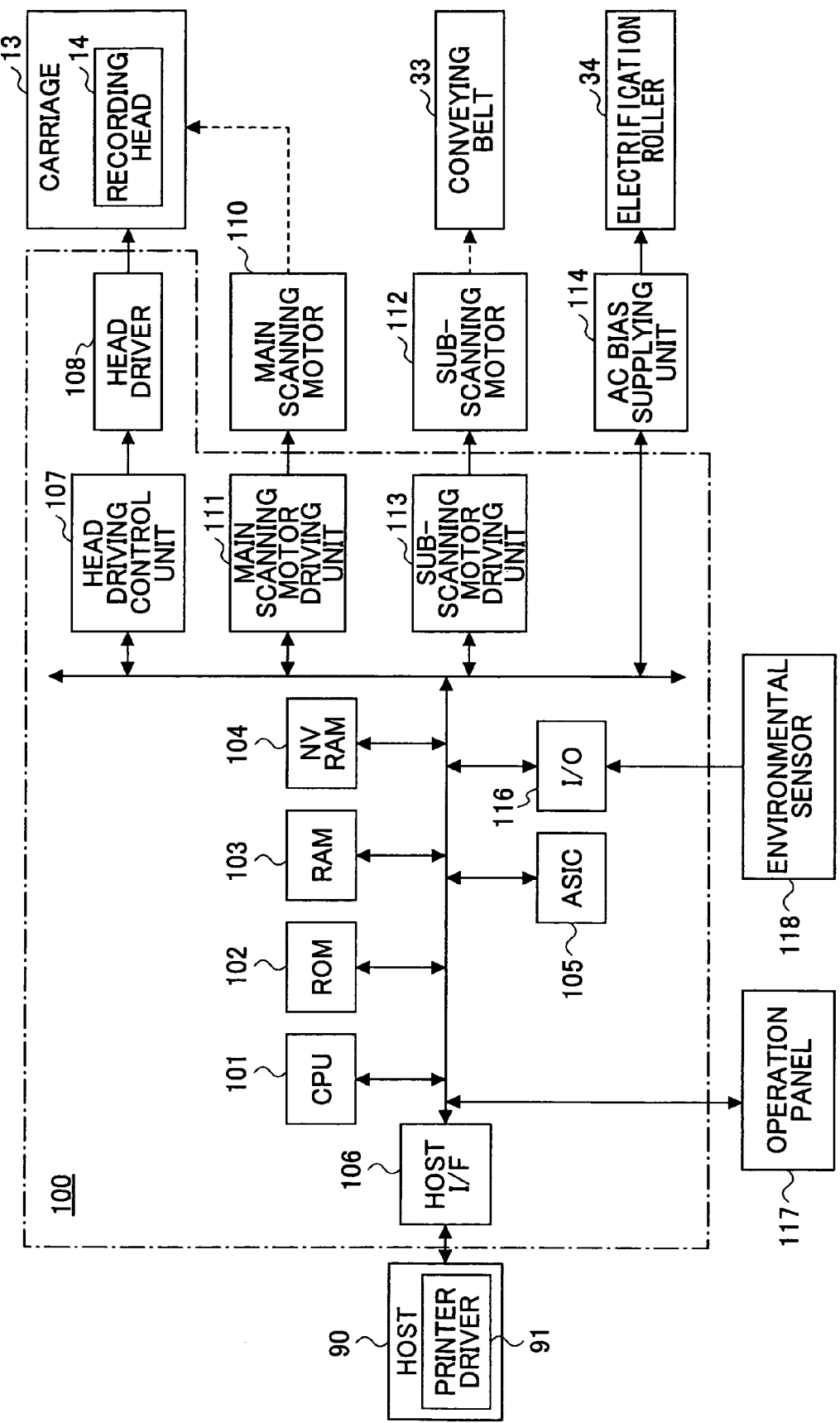
FIG. 6 is a block diagram schematically showing a control unit of the apparatus.

Next, an outline of a control unit of the image forming apparatus is described with reference to FIG. 6. FIG. 6 is a block diagram schematically showing the control unit of the apparatus.

A control unit 100 includes a CPU 101 for controlling the entire apparatus, a program performed by the CPU 101, a ROM 102 for storing other fixed data, a RAM 103 for temporarily storing image data and the like, a non-volatile memory (NVRAM) 104 for holding data while power supply of the apparatus is cut off, an ASIC 105 for performing various types of signal processing, image processing for rearranging (including a portion of image processing described in the following in some cases) and the lie, and other processing on input/output signals for controlling the entire apparatus, and the like.

The control unit 100 also includes an I/F 106 for transmitting/receiving data and signals from a host 90 such as a personal computer (hereafter also referred to as PC) including the image processing apparatus according to the present invention, a head driving control unit 107 and a head driver 108 controlling driving of the recording head 14, a main scanning motor driving unit 111 driving a main scanning motor 110, a sub-scanning motor driving unit 113 driving a sub-scanning motor 112, an environmental sensor 118 for detecting environmental temperature and/or environmental humidity, an I/O 116 for inputting detection signals from various types of sensors which are not shown in the drawings, and the like.

Further, an operation panel 117 for inputting and displaying information necessary for the apparatus is connected to the control unit 100. The control unit 100 switches on/off the AC bias supplying unit 114 applying a high voltage to the electrification roller 34 and performs switching control on output polarity thereof.

The control unit 100 receives printing data including image data from the host 90, namely, a data processing apparatus such as a personal computer and the like, an image reading apparatus such as an image scanner and the like, and an imaging apparatus such as a digital camera and the like via a cable or a network using the I/F 106. A printer driver 91 of the host 90 according to the present invention generates and outputs printing data to the control unit 100.

The CPU 101 reads out and analyzes the printing data in a reception buffer included in the I/F 106, performs rearranging processing on the data (this processing may include a portion of other image processing described in the following) and the like, and transfers image data to the head driving control unit 107. Conversion of the printing data into bitmap data for image output is performed by expanding the image data in the printer driver 91 of the host 90 and then transmitting the expanded data to the apparatus. However, the conversion may be performed after font data is stored in the ROM 102, for example.

When the head driving control unit 107 receives image data (dot pattern data) corresponding to a single row of the recording head 14, the head driving control unit 107 transmits the dot pattern data of a single row to the head driver 108 in synchronization with clock signals and also transmits a latch signal to the head driver 108 at a predetermined time.

The head driving control unit 107 includes a ROM (this may be the ROM 102) in which pattern data of driving waveforms (driving signals) is stored, a driving waveform generating circuit including a waveform generating circuit with a D/A converter for converting data on driving waveforms read out from the ROM, an amplifier, and the like.

The head driver 108 includes a shift register for inputting clock signals and serial data as image data from the head driving control unit 107, a latch circuit for latching registry values of the shift register using latch signals from the head driving control unit 107, a level converting circuit (level shifter) for changing levels of output values of the latch circuit, an analog switch array (switching unit) whose switching on/off is controlled by the level shifter, and the like. By controlling the switching on/off of the analog switch array, predetermined driving waveforms included in driving waveforms are selectively applied to an actuator unit of the recording head 14 so as to drive the head.

Next, an example of other configuration of the image processing apparatus (data processing apparatus) is described with reference FIGS. 7 and 8, the image processing apparatus including a printer driver according to the present invention, which is used as a host for transmitting image data in order to form images by the image forming apparatus. The image processing apparatus and the aforementioned image forming apparatus constitute an image forming system according to the present invention.

Figure 7:
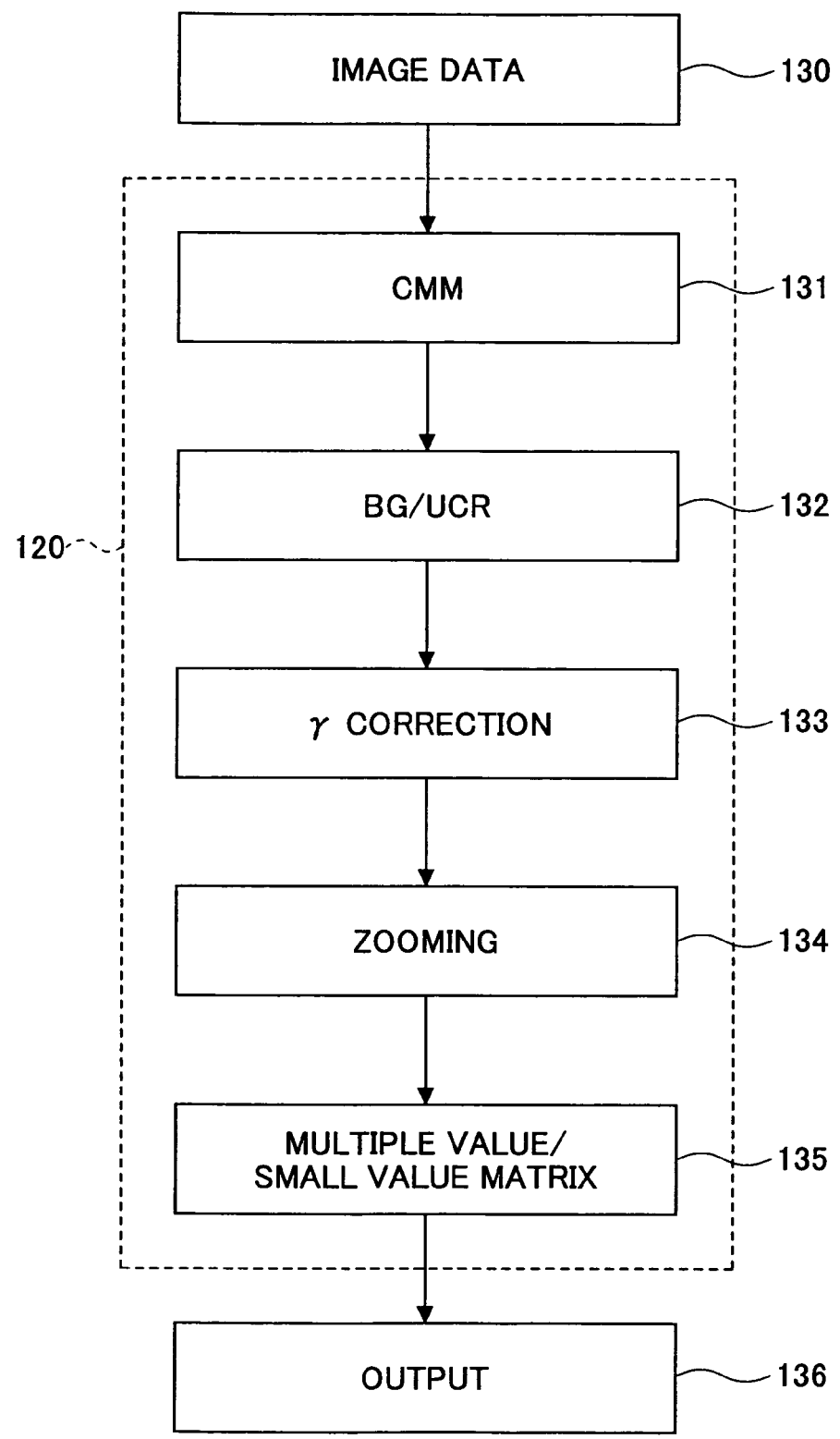
FIG. 7 is a block diagram functionally describing an example of a structure of a printer driver relating to an image processing apparatus according to the present invention.

First, in an example shown in FIG. 7, the printer driver 91 includes a CMM (Color Management Module) processing unit 131 as a color space conversion processing unit according to the present invention in which image data 130 provided from application software or the like is converted from a color space for monitor display to a color space for a recording apparatus (RGB color coordinates to CMY color coordinates), a BG/UCR (black generation/Under Color Removal) processing unit 132 performing black generation/under color removal from CMY values, a γ correction unit 133 performing input/output correction based on characteristics of the recording apparatus and user preferences, a zooming unit 134 performing enlargement processing in accordance with resolution of the recording apparatus, and a halftone processing unit 135 replacing the image data with a pattern arrangement of dots injected from the recording apparatus including a multiple value/small value matrix.

Figure 8:
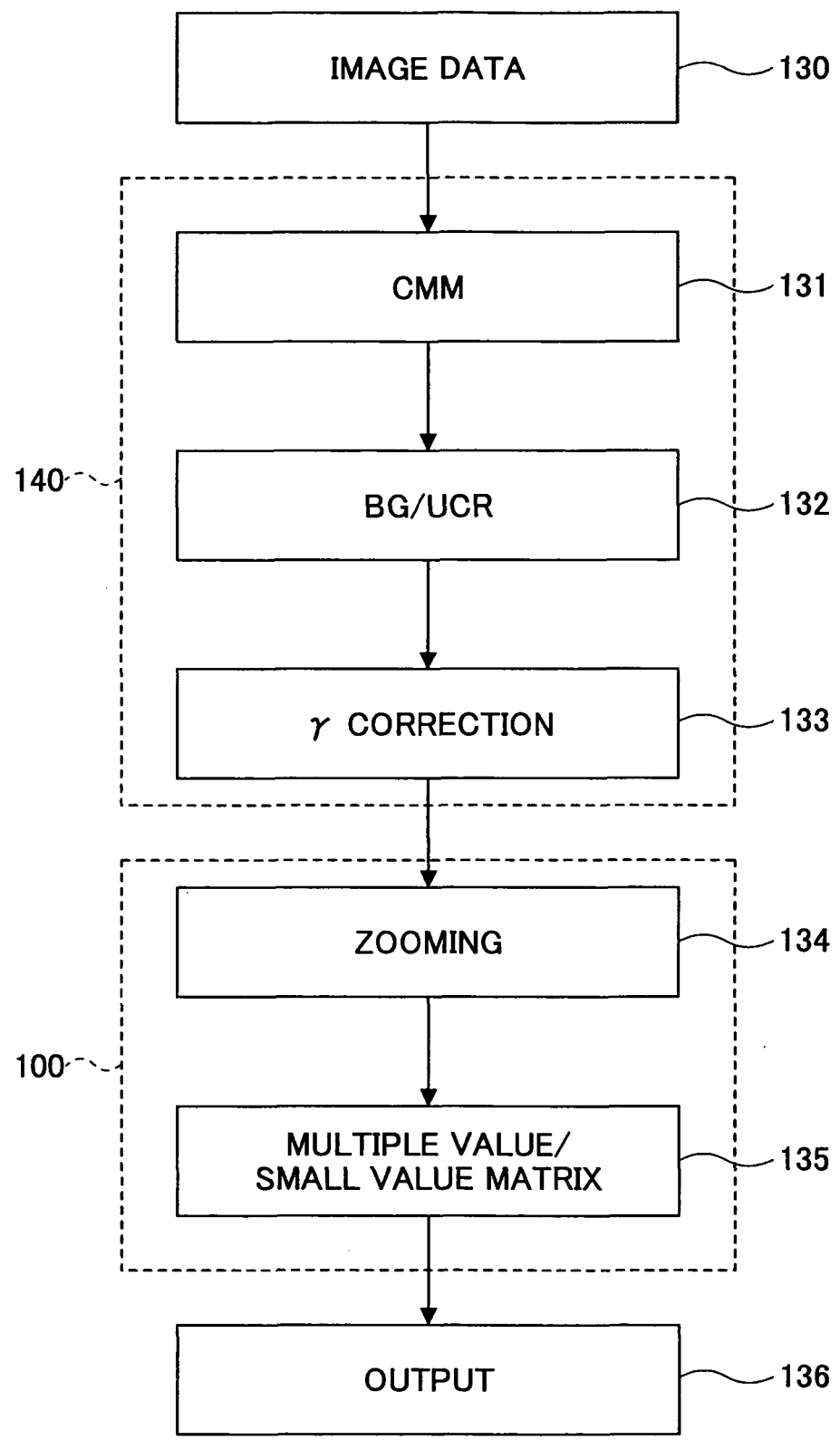
FIG. 8 is a block diagram functionally describing another example of a structure of a printer driver according to the present invention.

Further, in an example shown in FIG. 8, the printer driver 91 includes the CMM (Color Management Module) processing unit 131 converting the image data 130 provided from application software or the like from a color space for monitor display to a color space for the recording apparatus (RGB color coordinates to CMY color coordinates), the BG/UCR (black generation/Under Color Removal) processing unit 132 performing black generation/under color removal from CMY values, and the γ correction unit 133 performing input/output correction based on characteristics of the recording apparatus and user preferences.

In the case of the configuration of FIG. 8, the control unit 100 of the image forming apparatus includes the zooming unit 134 receiving output data after the γ correction processing and then performing enlargement processing in accordance with resolution of the recording apparatus, and the halftone processing unit 135 replacing the image data with a pattern arrangement of dots injected from the recording apparatus including a multiple value/small value matrix.

The example shown in FIG. 7 is what is called a "low-price machine" in which all image processing is performed in the PC and the example shown in FIG. 8 is what is called a "high-speed machine" in which a portion of processing is assigned to an ASIC built in the image forming apparatus. In the configuration example of FIG. 8, image processing is assigned to the host and the image forming apparatus and performed, so that it is possible not only to reduce time required for image processing but also to advance release of the host PC. However, a high-performance ASIC (and a large-capacity memory in some cases) needs to be mounted, so that the price of the high-speed machine is generally prone to be higher than that of the low-priced machine.

Figure 9:
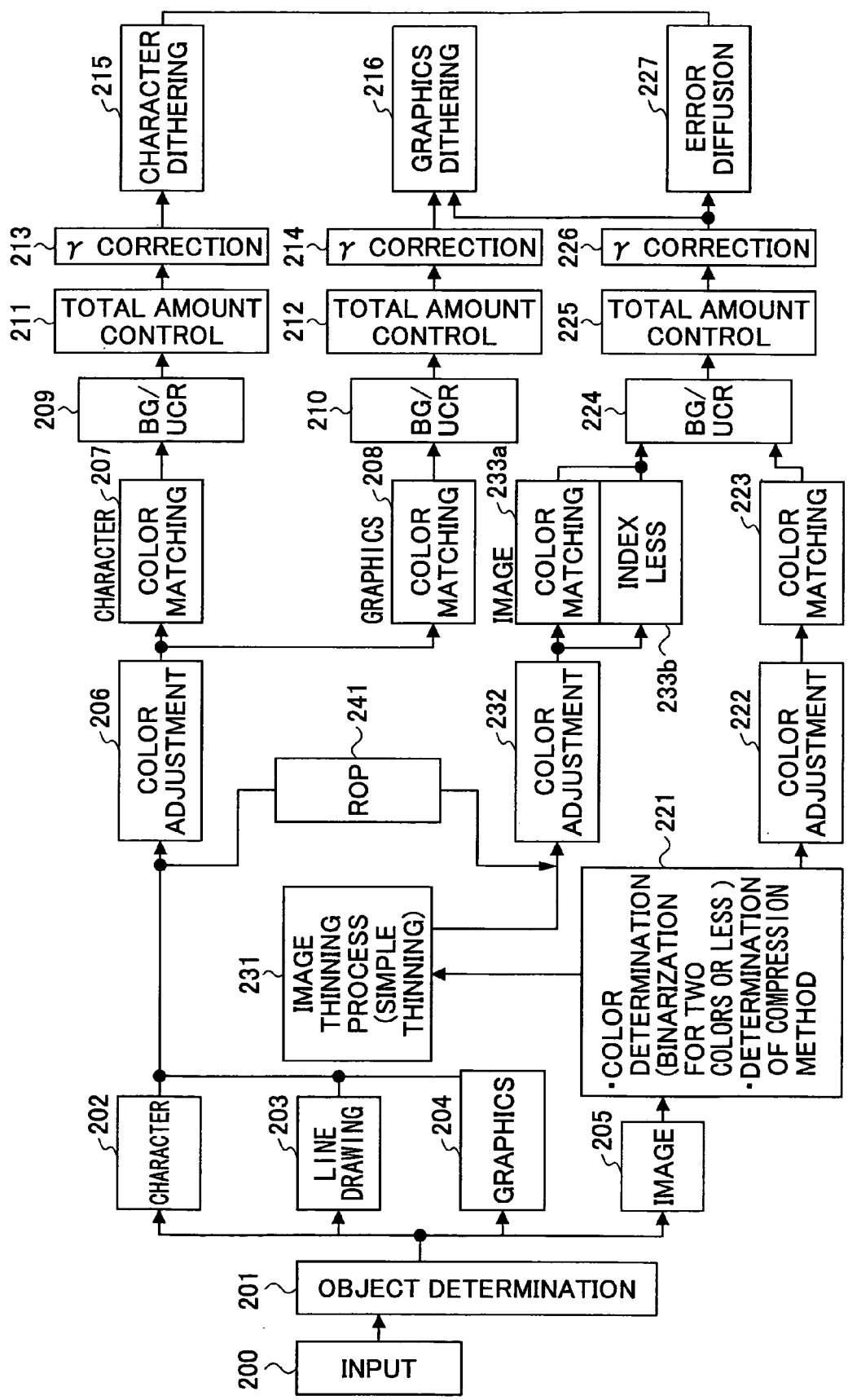
FIG. 9 is a block diagram describing the details of a flow of image processing in a printer driver.

Next, a flow of image processing by the printer driver 91 is described with reference to a block diagram shown in FIG. 9.

When a "print" order is issued from the application software operating on the data processing apparatus such as a personal computer, in the printer driver 91, object types of input 200 are determined at object determination processing 201. Data is handled in each object type, namely, image data 202 on characters, image data 203 on line drawings, image data 204 on graphics, and image data 205 on images, and each set of data is processed through each route.

Specifically, regarding the characters 202, line drawings 203, and graphics 204, color correction processing 206 is performed. Further, regarding the characters 202, color matching processing 207, BG/UCR processing 209, total amount control processing 211, γ correction processing 213, and character dithering processing (halftone processing) 215 are performed. Regarding the line drawings and graphics, color matching processing 208, BG/UCR processing 210, total amount control processing 212, γ correction processing 214, and graphics dithering processing (halftone processing) 216 are performed.

On the other hand, regarding the images 205, color determination processing and compression method determination processing 221 are performed. In a normal case, after color correction processing 222 and color matching processing 223 are performed, BG/UCR processing 224, total amount control processing 225, γ correction processing 226, and error diffusion processing (halftone processing) 227 are performed. In a case of two colors or less, after image thinning processing 231, color correction processing 232, and color matching processing 233a or indexless processing (processing without color matching) 233b, the BG/UCR processing 224, total amount control processing 225, γ correction processing 226, and error diffusion processing (halftone processing) 227 are performed.

In some cases, the process of the line drawings and graphics branches off before reaching the color correction processing 206. And ROP processing is performed and the process proceeds to the color correction processing 232 for images.

In this manner, the sets of image data processed in each object type are synthesized into a single set of image data again and then passed to the image forming apparatus.

An image processing method according to the present invention concerns "CMM processing" performed at the color matching processing, in which input data is converted from a color space for monitor display to a color space for the image forming apparatus (RGB color coordinates to CMY color coordinates).

Figure 10:
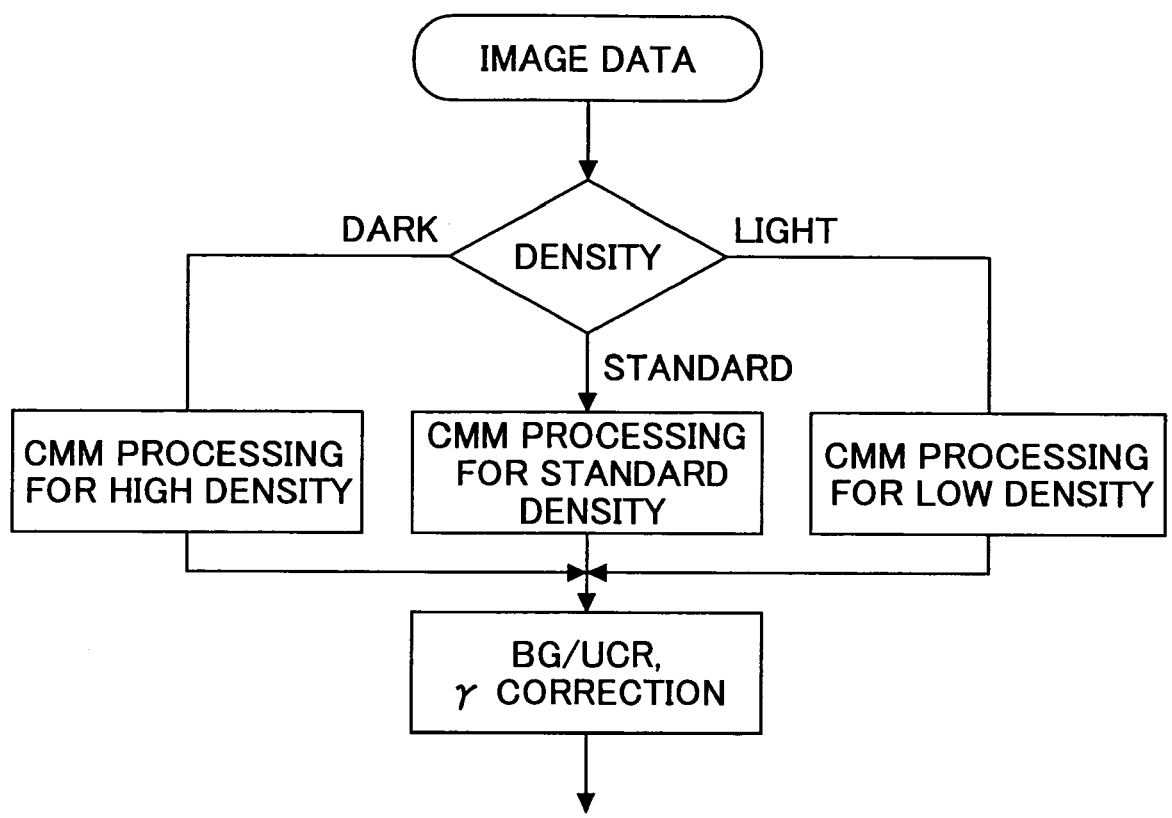
FIG. 10 is a flow diagram describing CMM processing in an embodiment of the present invention.

In one embodiment of the present invention, based on input data, color space conversion processing is performed in accordance with density specified upon converting to color space values for the image forming apparatus. In other words, in this case, three types of tables are provided in advance, namely, a table of color space conversion processing for high density (parameters of color space conversion processing), a table of color space conversion processing for standard density, and a table of color space conversion processing for low density, for example, as shown in FIG. 10. If a specified density is high density, the table of color space conversion processing for high density is selected and CMM processing is performed. If the specified density is standard density, the table of color space conversion processing for standard density is selected and the CMM processing is performed. If the specified density is low density, the table of color space conversion processing for low density is selected and the CMM processing is performed.

Figure 11:
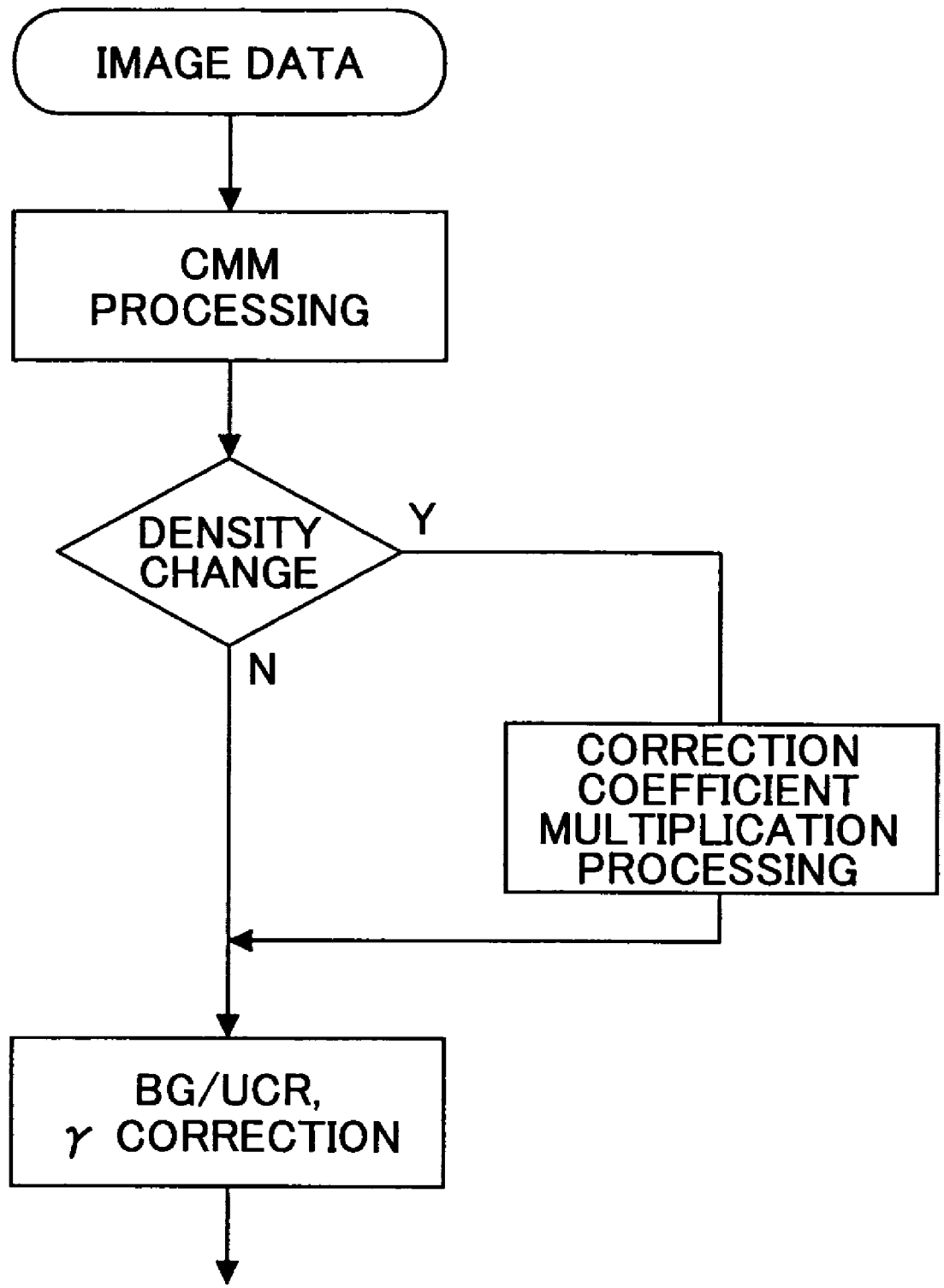
FIG. 11 is a flow diagram describing CMM processing in another embodiment of the present invention.

Further, in other embodiment of the present invention, based on the input data, values output from the table of color space conversion processing in accordance with density specified upon converting to color space values for the image forming apparatus are multiplied by a quadratic coefficient (correction coefficient) and resultant values are handled as CMM values (values after color space conversion). In other words, in this case, as shown in FIG. 11, a table of color space conversion processing (parameters of color space conversion processing) is provided as a standard, for example, and whether correction of the table of color space conversion processing is necessary is determined (correction is necessary when a specified density is higher or lower than the standard). If the correction is not necessary, the output values obtained using the table of color space conversion processing are handled as the CMM values. If the correction is necessary, values obtained by multiplying the output values obtained using the table of color space conversion processing by the correction coefficient corresponding to the specified density are handled as the CMM values.

Figure 12:
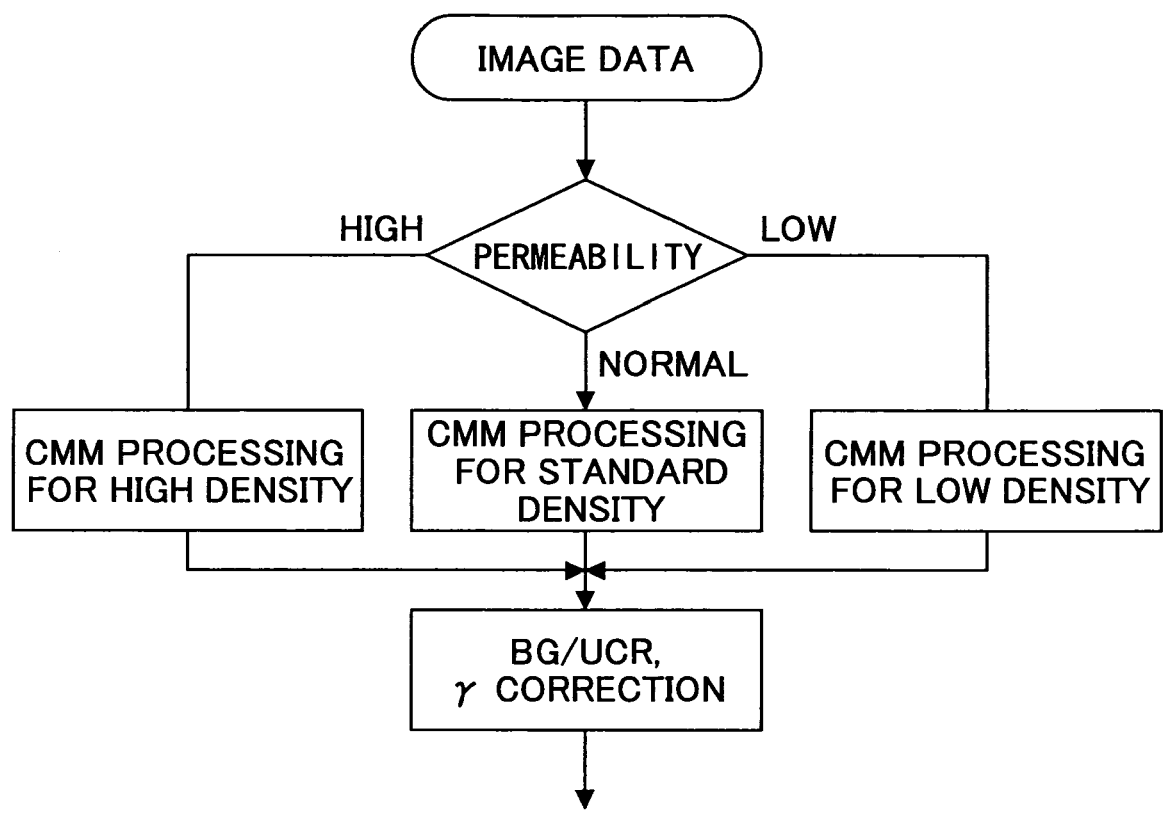
FIG. 12 is a flow diagram describing CMM processing in another embodiment of the present invention.

Further, in other embodiment of the present invention, based on the input data, upon converting to color space values for the image forming apparatus, color space conversion processing is performed in accordance with characteristics of permeability of paper to a coloring agent. In other words, in this case, three types of tables are provided in advance, namely, a table of color space conversion processing for high density (parameters of color space conversion processing), a table of color space conversion processing for standard density, and a table of color space conversion processing for low density, for example, as shown in FIG. 12. If the permeability of paper to a coloring agent is high, the table of color space conversion processing for high density is selected and CMM processing is performed. If the permeability of the paper to the coloring agent is normal, the table of color space conversion processing for standard density is selected and the CMM processing is performed. If the permeability of the paper to the coloring agent is low, the table of color space conversion processing for low density is selected and the CMM processing is performed.

Figure 13:
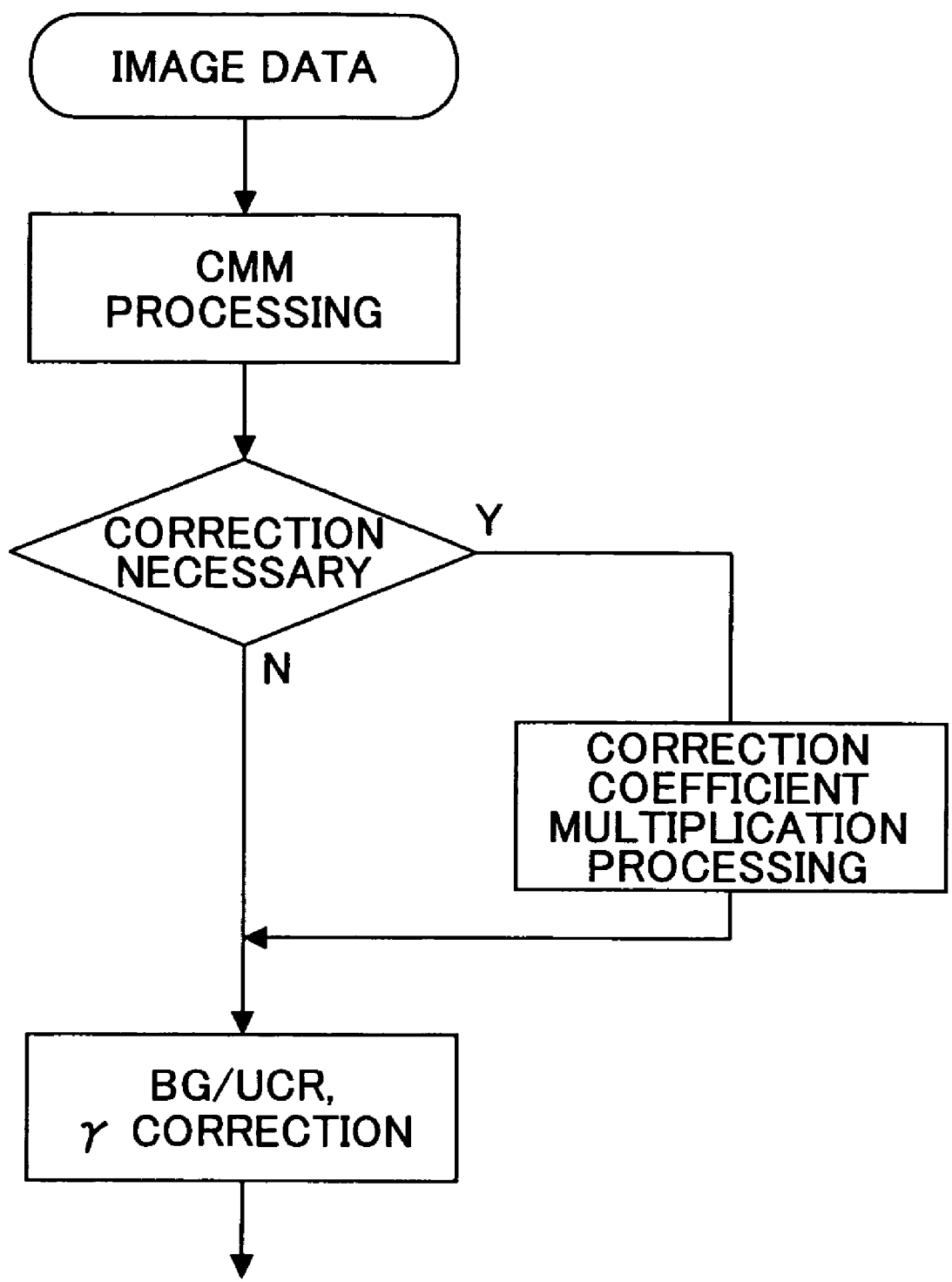
FIG. 13 is a flow diagram describing CMM processing in another embodiment of the present invention.

Further, in other embodiment of the present invention, based on the input data, values output from the table of color space conversion processing in accordance with characteristics of permeability of paper to a coloring agent upon converting to color space values for the image forming apparatus are multiplied by a quadratic coefficient (correction coefficient) and resultant values are handled as the CMM values (values after color space conversion). In other words, in this case, as shown in FIG. 13, a table of color space conversion processing (parameters of color space conversion processing) is provided as a standard, for example, and whether correction of the table of color space conversion processing is necessary is determined (correction is necessary when the permeability of the paper to the coloring agent is higher or lower than the standard). If the correction is not necessary, the output values obtained using the table of color space conversion processing are handled as the CMM values. If the correction is necessary, values obtained by multiplying the output values obtained using the table of color space conversion processing by the correction coefficient corresponding to the characteristics of the permeability of the paper to the coloring agent are handled as the CMM values.

In this case, as shown in FIG. 14, a table of color space conversion processing in which values output after color space conversion processing on input values are arranged in a LUT (Look Up Table) table is used as the table of color space conversion processing. In the (LUT) table of color space conversion processing, combinations of output values K, C, Y, and M are preferably included with respect to all of input values 0 to 255 of R, G, and B. However, this may reduce processing speed or increase data size. Thus, in practical implementation, it is preferable to extract interpolation points (preferably 17 points or so from 0 to 255) and use interpolation such as linear interpolation, tetrahedral interpolation, hexahedral interpolation, and the like.

In this case, the table of color space conversion processing has different gradation characteristics in each object (characters, graphics, and images) constituting image data to be output and no reverse gradation is generated. In accordance with this, it is possible to adjust density of each object without causing reverse gradation.

Figure 15:
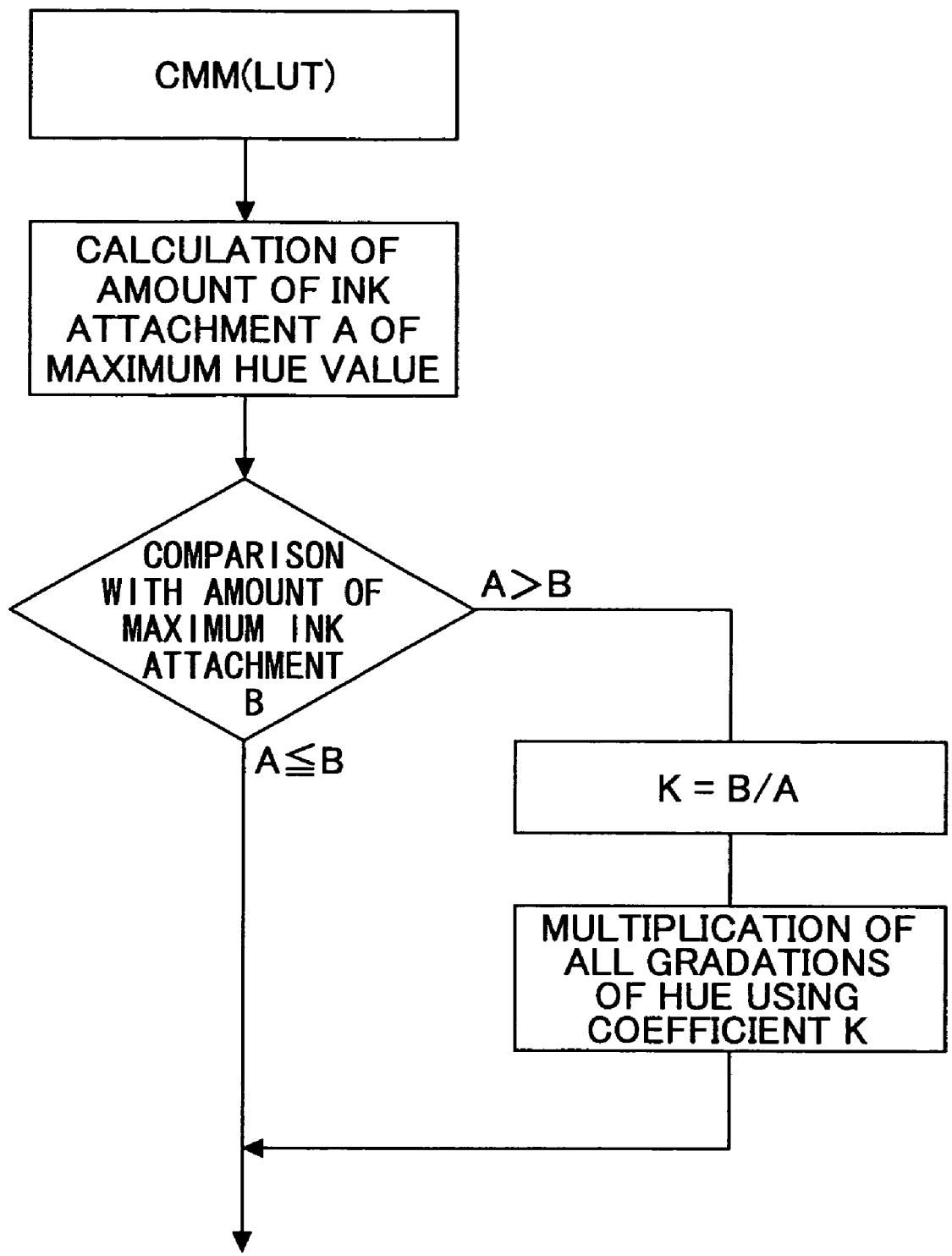
FIG. 15 is a flow diagram describing an algorithm for multiplication using a coefficient obtained from an amount of ink attachment.

Next, when color space conversion processing is performed by multiplying output values obtained using the table of color space conversion processing by the quadratic coefficient as the correction coefficient, as shown in FIG. 15, an amount of ink attachment A of a maximum value in each hue is compared with an optimal amount of ink attachment B relative to the specified density. If A>B, the quadratic coefficient K is calculated by performing an arithmetical operation on the quadratic coefficient K=B/A. In accordance with this, a quadratic coefficient table (LUT) of each color is created.

In this case, the quadratic coefficient K to be multiplied has different values in each hue and the maximum value of each hue after color space conversion processing satisfies a coefficient value for "a maximum amount of a primary color in a color space after conversion≦a value after conversion≦a maximum amount of attachment of a recording liquid defined under printing conditions". In accordance with this, it is possible to adjust density without causing reverse gradation.

Then, output values of all gradations of hues from the table of color space conversion processing are multiplied by the quadratic coefficient K of the quadratic coefficient table. In accordance with this, it is possible to control the amount of ink attachment and obtain a necessary image density.

Figure 16A:
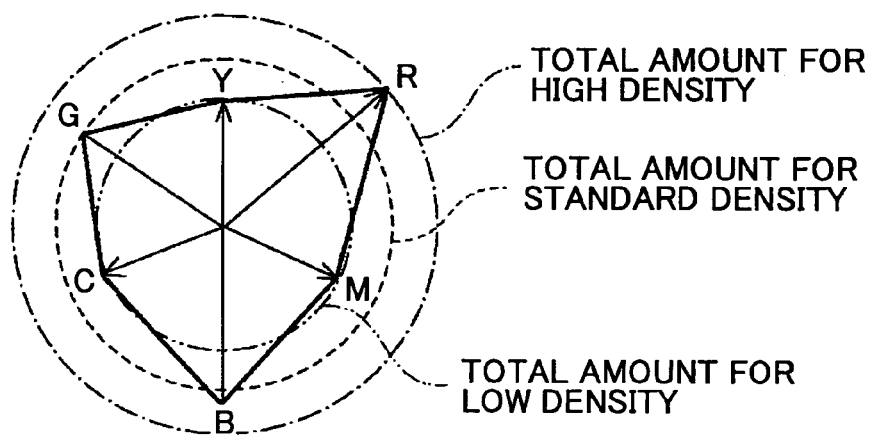
FIG. 16A is an illustration two-dimensionally showing a conceptual diagram of hue compression when an amount of ink attachment is changed.
Figure 16B:
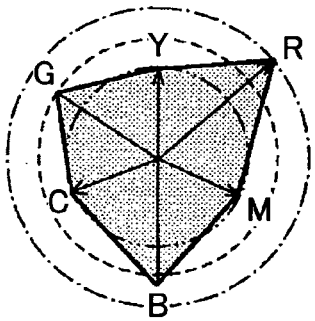
FIG. 16B is an illustration two-dimensionally showing a conceptual diagram of hue compression for high density.
Figure 16C:
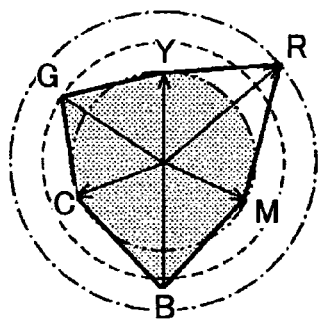
FIG. 16C is an illustration two-dimensionally showing a conceptual diagram of hue compression for standard density.
Figure 16D:
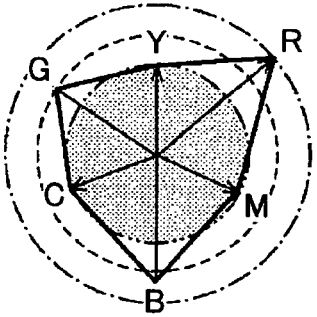
FIG. 16D is an illustration two-dimensionally showing a conceptual diagram of hue compression for low density.
Figure 17:
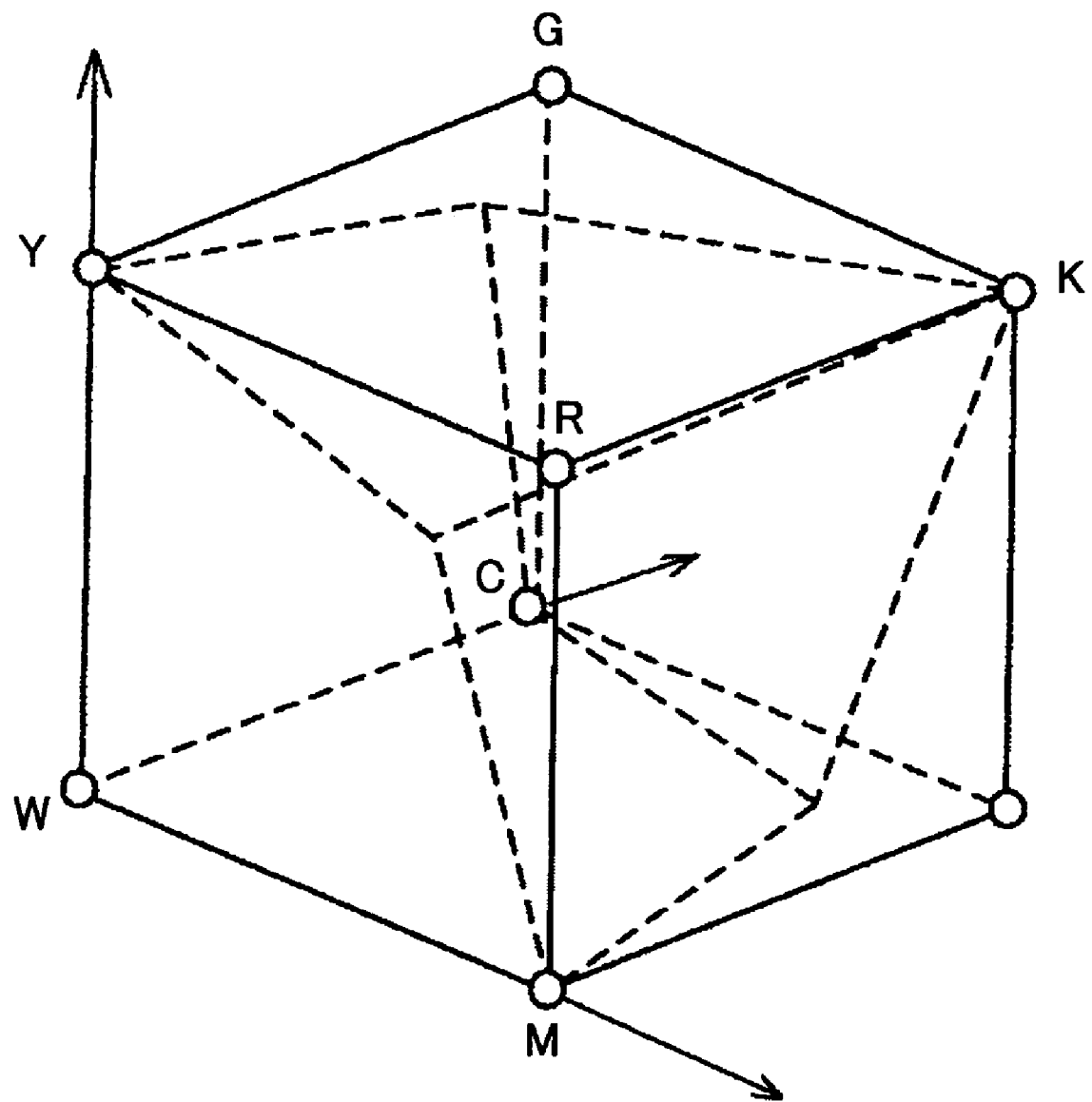
FIG. 17 an illustration three-dimensionally showing a conceptual diagram of hue compression when an amount of ink attachment is changed.

FIGS. 16A to 16D and 17 show conceptual diagrams of hue compression when an amount of ink attachment is changed. As shown in the diagram, FIG. 16A sets a relationship between each of primary colors and a total amount when density is high (total amount for high density), a total amount when density is standard (total amount for standard density), and a total amount when density is low (total amount for low density). As a result of this, as shown in FIG. 16B, in CMM for high density where the density is relatively high, R is defined from the total amount for high density, G and B are defined from the total amount for standard density, C, M, and Y are defined from the total amount for low density. In CMM for standard density, R, G, and B are defined from the total amount for standard density, C, M, and Y are defined from the total amount for low density. In CMM for low density, R, G, B, C, M, and Y are defined from the total amount for low density.

Figure 18:
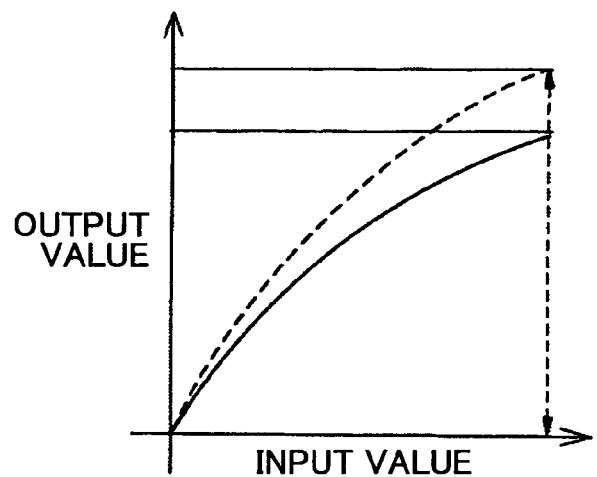
FIG. 18 is an illustration showing an example of a gradation change when each hue is multiplied by a coefficient.
Figure 18:
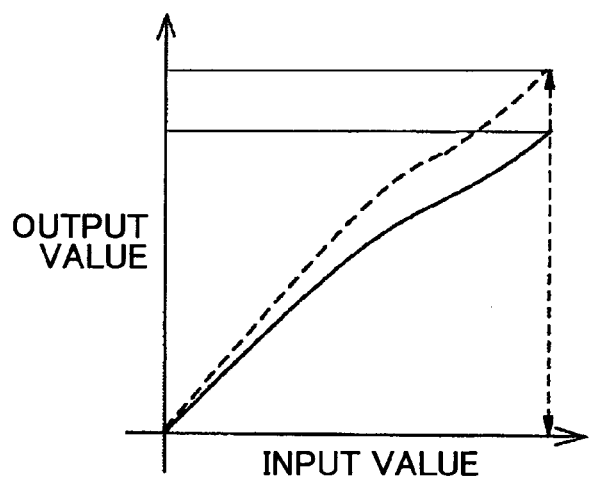
Figure 18:
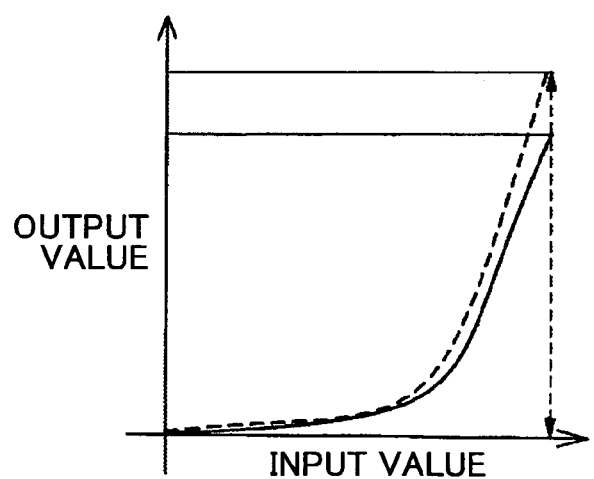

In this case, the quadratic coefficient for multiplication is configured to have different coefficient values in a gradation direction in each object (characters, graphics, and images) constituting image data to be output and to cause no reverse gradation characteristics before and after the multiplication using the coefficient. For example, as shown in FIG. 18, the quadratic coefficient is configured to cause no reverse gradations of output values after the multiplication, in which the entire portion of output values before the coefficient multiplication shown in a solid line is multiplied by the coefficient and output values after the multiplication shown in a broken line are obtained. In accordance with this, density is adjusted while maintaining the gradations.

In both cases when the plural tables of color space conversion processing are used, and when the output values from the table of color space conversion processing used as a standard are multiplied, specifically, the color space conversion processing is performed such that image density is ensured with any type of what is called "plain paper" (paper whose surface is not subjected to coating processing).

Particularly, in coarse paper with a high permeability to a coloring agent, the coloring agent is permeated into the paper without staying on a surface thereof, so that a recording image may be viewed as rather thin. In such a case, when a specified density is high, parameters of color space conversion processing are used such that the amount of ink attachment is increased so as to hold the coloring agent on the surface of the paper. In accordance with this, the density of the recording image is high.

Figure 19:
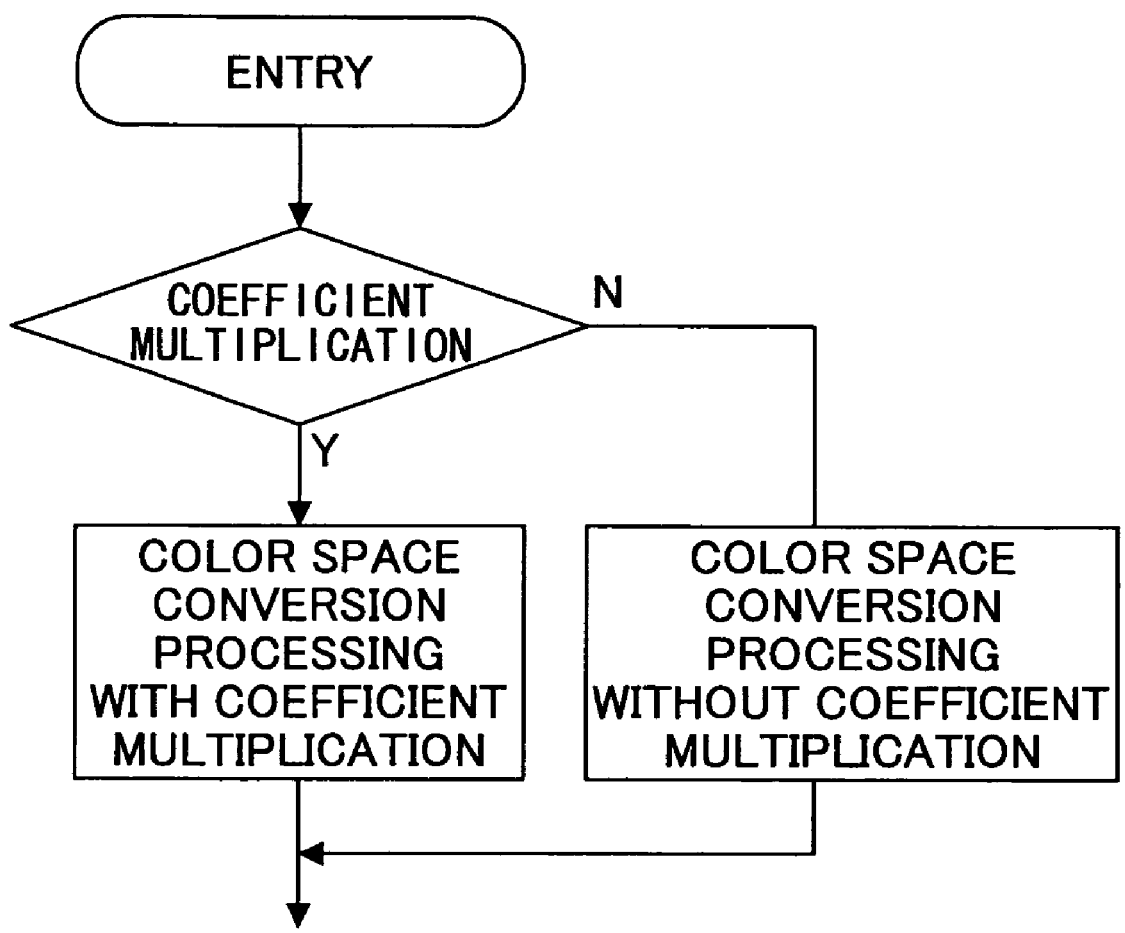
FIG. 19 is a flow diagram showing an example of color space conversion processing when it is selectable.

Further, when a user interface (UI) screen of the printer driver is used, the user is capable of selecting either the color space conversion processing where the coefficient multiplication processing is performed or the color space conversion processing where the coefficient multiplication processing is not performed. As shown in FIG. 19, by performing the color space conversion processing as a result of the user selection, it is possible to obtain an image with density in accordance with user preferences in an improved manner.

The examples in this case are described based on the case where the table of color space conversion processing corresponding to the specified density is used among the plural tables of color space conversion processing in accordance with the specified density, or the case where the output values from the table of color space conversion processing used as the standard are multiplied by the quadratic coefficient set in accordance with the specified density. However, the present invention is not limited to these specifically disclosed cases.

As mentioned above, based on the characteristics regarding the permeability of the paper to the coloring agent in which an image is formed, the table of color space conversion processing corresponding to the characteristics of the paper is used among the plural tables of color space conversion processing or the output values from the table of color space conversion processing used as a standard are multiplied by the quadratic coefficient set based on the characteristics of the paper.

In other words, as mentioned above, if coarse paper with a high permeability to a coloring agent is used, for example, the coloring agent is permeated into the paper without staying on a surface thereof, so that a recording image may be viewed as rather thin. When paper to be used has such characteristics and the permeability to a coloring agent is high, parameters of color space conversion processing are used such that the amount of ink attachment is increased so as to hold the coloring agent on the surface of the paper. In accordance with this, the density of the recording image is high.

In this case, it is possible to obtain information on the characteristics of the permeability to the coloring agent for the paper as described in the following, for example.

Specifically, the information on the characteristics of the permeability can obtained when the user observes the density of the image printed on the paper and selects parameters regarding color space conversion processing based on user preferences. In this case, such processing is substantially the same as specifying the density such that the density of the image is increased when the density is low.

Further, the information on the characteristics of the permeability can be obtained based on a detection result of brightness or density of the paper to be used. Specifically, an optical sensor for detecting the brightness or density of the paper to be used is disposed in a paper conveyance path. A table of color space conversion processing for the detection result of this optical sensor is selected or an amount of a maximum ink attachment is obtained from the detection result of the sensor and a quadratic coefficient is calculated. Then, the output values from the table of color space conversion processing used as a standard are multiplied by the quadratic coefficient.

Further, the information on the characteristics of the permeability can be obtained based on a detection result of a paper feed unit feeding paper. Specifically, a storage unit storing results of user specified setting in association with each paper feed unit may be provided. A specific paper feed unit used for feeding paper is detected, and setting results stored in the storage unit and corresponding to the detected paper feed unit are read out. Then, a table of color space conversion processing stored in the storage unit is selected or output values from a table of color space conversion processing used as a standard are multiplied by a stored quadratic coefficient.

Further, a product name of paper may be stored in association with a table of color space conversion processing or a quadratic coefficient to be used. When the user selects the product name of paper to be used, the table of color space conversion processing or the quadratic coefficient may automatically selected.

Further, a detection unit detecting density of an image formed on paper may be disposed on a downstream side (on a paper ejection path) relative to an image forming unit (recording head) for the paper. Based on a detection result of the image density detecting unit, a table or a quadratic coefficient to be used for the following image forming may be selected.

In the aforementioned embodiments, the image processing apparatus is constructed so that the printer driver as a program according to the present invention will cause a computer to perform the image processing method according to the present invention. However, the image forming apparatus per se may include a unit performing the above-mentioned image processing method.

The present invention is not limited to the specifically disclosed embodiment, and variations and modifications may be made without departing from the scope of the present invention.

The present application is based on Japanese priority application No. 2005-253279 filed Sep. 1, 2005, the entire contents of which are hereby incorporated herein by reference.

What is claimed is:

1. An image processing method for generating and processing image data to be sent to an image forming apparatus including a recording head for ejecting droplets of a recording liquid, the image forming apparatus forming an image on paper based on input data, the image processing method comprising:

color space conversion processing upon converting input data to color space values for the image forming apparatus in accordance with a specified density, wherein a table of color space conversion processing is used as a standard and has different gradation characteristics in each of objects constituting image data to be output and table values so as not to cause reverse gradations, wherein the table values from the table of color space conversion processing are multiplied by a quadratic coefficient K so as to perform color space conversion processing, and wherein if an amount of ink attachment A of a maximum value in each hue is more than an optimal amount of ink attachment B relative to the specified density, the quadratic coefficient K is calculated by performing an arithmetical operation of K=B/A, and the quadratic coefficient K is not multiplied if A is less than or equal to B.

2. The image processing method according to claim 1, wherein a plurality of tables of color space conversion processing used upon converting input data to color space values is included.

3. The image processing method according to claim 1, wherein the quadratic coefficient to be multiplied has different values in each hue and a maximum value of each hue after the color space conversion processing is a coefficient value for "a maximum amount of a primary color in a color space after conversion≦a value after conversion≦a maximum amount of attachment of a recording liquid defined under printing conditions".

4. The image processing method according to claim 1, wherein the quadratic coefficient to be multiplied is configured to have different coefficient values in a gradation direction in each object constituting image data to be output and to cause no reverse gradation characteristics before and after the multiplication.

5. The image processing method according to claim 1, further comprising performing, based on a result of selection, either color space conversion processing where the coefficient multiplication processing is performed or color space conversion processing where the coefficient multiplication processing is not performed.

6. The image processing method according to claim 1, performing, said method is performed to adjust the density of the image formed by the image forming apparatus, without causing the reverse gradations.

7. An image processing method for generating and processing image data to be sent to an image forming apparatus including a recording head for ejecting droplets of a recording liquid, the image forming apparatus forming an image on paper based on input data, the image processing method comprising:

color space conversion processing upon converting input data to color space values for the image forming apparatus in accordance with characteristics regarding permeability of the paper to a coloring agent, wherein a table of color space conversion processing is used as a standard and has different gradation characteristics in each of objects constituting image data to be output and table values so as not to cause reverse gradations, wherein values from the table of color space conversion processing are multiplied by a quadratic coefficient K so as to perform color space conversion processing, and wherein if an amount of ink attachment A of a maximum value in each hue is more than an optimal amount of ink attachment B relative to a specified density, the quadratic coefficient K is calculated by performing an arithmetical operation of K=B/A, and the quadratic coefficient K is not multiplied if A is less than or equal to B.

8. The image processing method according to claim 7, wherein information on the characteristics regarding the permeability of the paper to a coloring agent is provided from a user.

9. The image processing method according to claim 7, wherein information on the characteristics regarding the permeability of the paper to a coloring agent is provided based on a detection result of brightness or density of the paper.

10. The image processing method according to claim 7, wherein information on the characteristics regarding the permeability of the paper to a coloring agent is provided based on a detection result of a paper feed unit feeding the paper.

11. The image processing method according to claim 7, wherein information on the characteristics regarding the permeability of the paper to a coloring agent is provided based on a detection result of a density of an image formed on the paper.

12. The image processing method according to claim 7, wherein a plurality of tables of color space conversion processing used upon converting input data to color space values is included.

13. The image processing method according to claim 7, wherein the quadratic coefficient to be multiplied has different values in each hue and a maximum value of each hue after the color space conversion processing is a coefficient value for "a maximum amount of a primary color in a color space after conversion$\leqq$a value after conversion$\leqq$a maximum amount of attachment of a recording liquid defined under printing conditions".

14. The image processing method according to claim 7, wherein the quadratic coefficient to be multiplied is configured to have different coefficient values in a gradation direction in each object constituting image data to be output and to cause no reverse gradation characteristics before and after the multiplication.

15. The image processing method according to claim 7, further comprising performing, based on a result of selection, either color space conversion processing where the coefficient multiplication processing is performed or color space conversion processing where the coefficient multiplication processing is not performed.

16. A computer-readable medium tangibly embodying a program of instructions which, when executed by a computer, causes the computer to perform a process for generating image data to be sent to an image forming apparatus including a recording head for ejecting droplets of a recording liquid, the image forming apparatus forming an image based on input data, the process comprising:

color space conversion processing upon converting input data to color space values for the image forming apparatus in accordance with a specified density, wherein a table of color space conversion processing is used as a standard and has different gradation characteristics in each of objects constituting image data to be output and table values so as not to cause reverse gradations, wherein values from the table of color space conversion processing are multiplied by a quadratic coefficient K so as to perform color space conversion processing, and wherein if an amount of ink attachment A of a maximum value in each hue is more than an optimal amount of ink attachment B relative to the specified density, the quadratic coefficient K is calculated by performing an arithmetical operation of K=B/A, and the quadratic coefficient K is not multiplied if A is less than or equal to B.

\* \* \* \* \*